(12) United States Patent
Kubouchi et al.

(10) Patent No.: US 10,418,801 B2
(45) Date of Patent: Sep. 17, 2019

(54) THREE-LEVEL CHOPPER APPARATUS

(71) Applicant: FUJI ELECTRIC CO., LTD., Kawasaki-shi, Kanagawa (JP)

(72) Inventors: Motoyoshi Kubouchi, Matsumoto (JP); Yasushi Abe, Hino (JP)

(73) Assignee: FUJI ELECTRIC CO., LTD., Kawasaki-Shi, Kanagawa (JP)

( * ) Notice: Subject to any disclaimer, the term of this patent is extended or adjusted under 35 U.S.C. 154(b) by 256 days.

(21) Appl. No.: 15/468,450

(22) Filed: Mar. 24, 2017

(65) Prior Publication Data

US 2017/0302068 A1 Oct. 19, 2017

(30) Foreign Application Priority Data

Apr. 14, 2016 (JP) .................................. 2016-080699

(51) Int. Cl.
| | |
|---|---|
| *H02H 3/16* | (2006.01) |
| *H02H 7/08* | (2006.01) |
| *H02H 7/122* | (2006.01) |
| *H02M 3/158* | (2006.01) |
| *H02M 7/537* | (2006.01) |
| *H02P 29/024* | (2016.01) |

(52) U.S. Cl.
CPC .......... *H02H 7/1227* (2013.01); *H02H 3/165* (2013.01); *H02H 7/1222* (2013.01); *H02M 3/158* (2013.01); *H02M 7/537* (2013.01); *H02P 29/0241* (2016.02); *H02H 7/08* (2013.01)

(58) Field of Classification Search
CPC ........ H02H 3/165; H02H 7/08; H02H 7/1222; H02H 7/1227; H02P 29/0241; H02M 3/158; H02M 7/537
USPC .......................................................... 361/18
See application file for complete search history.

(56) References Cited

U.S. PATENT DOCUMENTS

| | | | |
|---|---|---|---|
| 7,292,462 B2 | 11/2007 | Watanabe et al. | |
| 7,965,069 B2 | 6/2011 | Watanabe et al. | |
| 8,816,618 B2 | 8/2014 | Fujii | |
| 2005/0078491 A1* | 4/2005 | Song ................. | H02M 3/33507 363/17 |

FOREIGN PATENT DOCUMENTS

| | | |
|---|---|---|
| JP | 4308035 B2 | 8/2009 |
| JP | 4886562 B2 | 2/2012 |
| JP | 5070937 B2 | 11/2012 |
| JP | 2013-038922 A | 2/2013 |
| WO | WO-2015049743 A1 * 4/2015 | ............ H02M 7/487 |

OTHER PUBLICATIONS

Machine Translation of Tanaka et al. International Patent Document WO 2015/049743 A1 Apr. 9, 2015 (Year: 2015).*

* cited by examiner

*Primary Examiner* — Kevin J Comber
(74) *Attorney, Agent, or Firm* — Manabu Kanesaka

(57) ABSTRACT

In a three-level chopper apparatus, a protection switch circuit is controllable to change a current pathway through which an overvoltage is applied to a second capacitor or a first capacitor to a current pathway through which no overvoltage is applied to the second capacitor or the first capacitor.

25 Claims, 29 Drawing Sheets

(a)

(b)

THREE-LEVEL CHOPPER APPARATUS

CROSS-REFERENCE TO RELATED APPLICATION

The priority application number JP2016-080699, Three-Level Chopper Apparatus, Apr. 14, 2016, Motoyoshi Kubouchi and Yasushi Abe, upon which this patent application is based, is hereby incorporated by reference.

BACKGROUND OF THE INVENTION

Field of the Invention

The present invention relates to a three-level chopper apparatus, and more particularly, it relates to a three-level chopper apparatus including a first capacitor and a second capacitor connected in series to each other.

Description of the Background Art

A three-level chopper apparatus including a first capacitor and a second capacitor connected in series to each other is known in general, as disclosed in Japanese Patent No. 4886562, for example.

Japanese Patent No. 4886562 discloses a power converter including a direct-current power supply, a reactor, a first switch and a second switch each including a transistor etc., a first capacitor and a second capacitor connected in series to each other, and first and second diodes. In this power converter, the reactor and the first and second switches are connected in series to the direct-current power supply. Both ends of the first switch are connected with a series circuit including the first diode and the first capacitor, and both ends of the second switch are connected with a series circuit including the second capacitor and the second diode.

This power converter is provided with a failure detector that detects a potential (hereinafter referred to as a midpoint potential) at a point at which the first capacitor and the second capacitor are connected in series to each other. The failure detector is configured to output a signal for stopping a step-down function of the power converter when a value of the midpoint potential goes beyond a preset range due to the short circuit failure of either the first capacitor or the second capacitor.

When a failure is generated in the power converter (chopper apparatus) described in Japanese Patent No. 4886562, it is common to provide for protection by disconnecting (turning off) the first switch and the second switch of the power converter or disconnecting (turning off) a semiconductor switch element of an inverter of a load connected to the power converter to prevent flow of a current to the load. When a short circuit failure is generated such that one (the first switch, for example) of the switches connected in series to each other fully conducts, for example, it is common practice to separate the load from the power converter by disconnecting the semiconductor switch element of the inverter of the load connected to the power converter and disconnect the other (the second switch, for example) of the switches of the power converter.

When a short circuit failure is generated such that one of the switches and the diode fully conducts, however, a series resonant current flows to the reactor connected to the direct-current power supply and the capacitor corresponding to the other of the switches not short-circuited by the failure through one of the switches short-circuited by the failure and the diode if the load is separated from the power converter by disconnecting the semiconductor switch element of the inverter of the load connected to the power converter, and the other of the switches of the power converter is disconnected, as in the conventional power converter. Thus, the capacitor corresponding to the other of the switches not short-circuited by the failure is disadvantageously charged to a voltage higher than the voltage of the direct-current power supply so that an overvoltage occurs in the capacitor.

SUMMARY OF THE INVENTION

The present invention has been proposed in order to solve the aforementioned problem, and an object of the present invention is to provide a three-level chopper apparatus capable of significantly reducing an overvoltage in a charged capacitor even when a failure is generated in a switch and/or a diode.

In order to attain the aforementioned object, a three-level chopper apparatus according to an aspect of the present invention includes a direct-current power supply, a first switch and a second switch, a first diode and a second diode, a first capacitor, a second capacitor, and a third capacitor, a first reactor and a second reactor, a connection path, and a protection switch circuit. The first switch, the first diode, the second diode, the second switch, the second capacitor, and the first capacitor are connected in series to each other in this order in a loop, the direct-current power supply is connected in parallel between a connection point between the first capacitor and the first switch and a connection point between the second switch and the second capacitor through the first reactor, the third capacitor is connected in parallel between a connection point between the first diode and the first switch and a connection point between the second switch and the second diode through the second reactor, the connection path connects a connection point between the first diode and the second diode and a connection point between the first capacitor and the second capacitor, and the protection switch circuit is controllable to change a current pathway through which an overvoltage is applied to the second capacitor or the first capacitor to a current pathway through which no overvoltage is applied to the second capacitor or the first capacitor when at least one of the first switch and the first diode or at least one of the second switch and the second diode has a failure.

In the aforementioned three-level chopper apparatus according to this aspect, the protection switch circuit is preferably a bidirectional protection switch connected in series to the connection path.

In this case, the bidirectional protection switch preferably includes a switch circuit in which a semiconductor switch element including at least one of an IGBT, a MOSFET, and a bipolar transistor is connected in series to a diode, or two reverse blocking IGBTs connected in anti-parallel to each other.

In the aforementioned structure in which the protection switch circuit is the bidirectional protection switch, the bidirectional protection switch preferably includes a switch circuit in which a semiconductor switch element including at least one of an IGBT, a MOSFET, and a bipolar transistor is connected in anti-parallel to a diode, or two MOSFETs or two reverse conducting IGBTs connected in anti-series to each other.

In the aforementioned three-level chopper apparatus in which the bidirectional protection switch includes the diode, the diode of the bidirectional protection switch preferably includes a silicon diode.

In the aforementioned three-level chopper apparatus in which the bidirectional protection switch includes the diode, the diode of the bidirectional protection switch preferably includes a silicon carbide diode.

In the aforementioned three-level chopper apparatus in which the bidirectional protection switch includes the diode, the diode of the bidirectional protection switch preferably includes a diode in which a silicon diode and a silicon carbide diode are connected in parallel to each other.

In the aforementioned three-level chopper apparatus in which the protection switch circuit is the bidirectional protection switch, the protection switch circuit preferably includes a first resistance connected in parallel to the bidirectional protection switch.

In the aforementioned three-level chopper apparatus in which the protection switch circuit is the bidirectional protection switch, the protection switch circuit preferably includes a first protection capacitor connected in parallel to the bidirectional protection switch.

In the aforementioned three-level chopper apparatus according to this aspect, the protection switch circuit preferably includes a first protection switch connected in series between the first diode and the connection path, a second protection switch connected in series between the second diode and the connection path, and a second resistance connected in parallel between a connection point between the first diode and the first protection switch and a connection point between the second protection switch and the second diode.

In the aforementioned three-level chopper apparatus according to this aspect, the protection switch circuit preferably includes a third protection switch connected in series between the first diode and the connection path, a fourth protection switch connected in series between the second diode and the connection path, and a second protection capacitor connected in parallel between a connection point between the first diode and the third protection switch and a connection point between the fourth protection switch and the second diode.

In the aforementioned three-level chopper apparatus according to this aspect, the protection switch circuit preferably includes a fifth protection switch connected in series between the first capacitor and the connection path, a sixth protection switch connected in series between the second capacitor and the connection path, and a third resistance connected in parallel between a connection point between the first capacitor and the fifth protection switch and a connection point between the sixth protection switch and the second capacitor.

In the aforementioned three-level chopper apparatus according to this aspect, the protection switch circuit preferably includes a seventh protection switch connected in series between the first capacitor and the connection path, an eighth protection switch connected in series between the second capacitor and the connection path, and a third protection capacitor connected in parallel between a connection point between the first capacitor and the seventh protection switch and a connection point between the eighth protection switch and the second capacitor.

In the aforementioned three-level chopper apparatus according to this aspect, the protection switch circuit preferably includes a ninth protection switch connected in series to the first reactor, and a fourth resistance connected in parallel to both ends of the ninth protection switch.

In the aforementioned three-level chopper apparatus according to this aspect, the protection switch circuit preferably includes a tenth protection switch connected in series to the first reactor, and a fourth protection capacitor connected in parallel to both ends of the tenth protection switch.

In the aforementioned three-level chopper apparatus in which the protection switch circuit includes the third resistance or the fourth resistance, a resistance value R preferably satisfies a following formula (1): $R \geq 2 \times (2 \times L/C)^{1/2}$ where R represents a resistance value of the third resistance or a fourth resistance, L represents an inductance of the first reactor, and C represents the smaller of a capacity of the first capacitor and a capacity of the second capacitor.

In the aforementioned three-level chopper apparatus according to this aspect, the protection switch circuit preferably includes both or one of a first protection switch partial circuit connected in series to at least one of the first switch, the second capacitor, the first diode, and the connection path, and a second protection switch partial circuit connected in series to at least one of the second switch, the first capacitor, the second diode, and the connection path.

In this case, the first protection switch partial circuit preferably includes an eleventh protection switch, and is preferably connected in series to at least one of the first switch, the first diode, and the connection path.

In the aforementioned three-level chopper apparatus in which the protection switch circuit includes the first protection switch partial circuit, the first protection switch partial circuit preferably includes a twelfth protection switch, and a fifth resistance connected in parallel to the twelfth protection switch.

In the aforementioned three-level chopper apparatus in which the protection switch circuit includes the first protection switch partial circuit, the first protection switch partial circuit is preferably connected in series to the second capacitor, and a resistance value Ra preferably satisfies a following formula (2): $Ra \geq 2 \times (2 \times L/C2)^{1/2}$ where Ra represents a resistance value of the fifth resistance, L represents an inductance of the first reactor, and C2 represents a capacity of the second capacitor.

In the aforementioned three-level chopper apparatus in which the protection switch circuit includes the first protection switch partial circuit, the first protection switch partial circuit preferably includes a thirteenth protection switch, and a fifth protection capacitor connected in parallel to the thirteenth protection switch.

In the aforementioned three-level chopper apparatus in which the protection switch circuit includes the second protection switch partial circuit, the second protection switch partial circuit preferably includes a fourteenth protection switch, and is preferably connected in series to the second switch, the second diode, or the connection path.

In the aforementioned three-level chopper apparatus in which the protection switch circuit includes the second protection switch partial circuit, the second protection switch partial circuit preferably includes a fifteenth protection switch, and a sixth resistance connected in parallel to the fifteenth protection switch.

In this case, the second protection switch partial circuit is preferably connected in series to the first capacitor, and a resistance value Rb preferably satisfies a following formula (3): $Rb \geq 2 \times (2 \times L/C1)^{1/2}$ where Rb represents a resistance value of the sixth resistance, L represents an inductance of the first reactor, and C1 represents a capacity of the first capacitor.

In the aforementioned three-level chopper apparatus in which the protection switch circuit includes the second protection switch partial circuit, the second protection switch partial circuit preferably includes a sixteenth protection switch, and a sixth protection capacitor connected in parallel to the sixteenth protection switch.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention are hereinafter described with reference to the drawings.

First Embodiment

A three-level chopper apparatus according to a first embodiment is now described.

Figure 1:
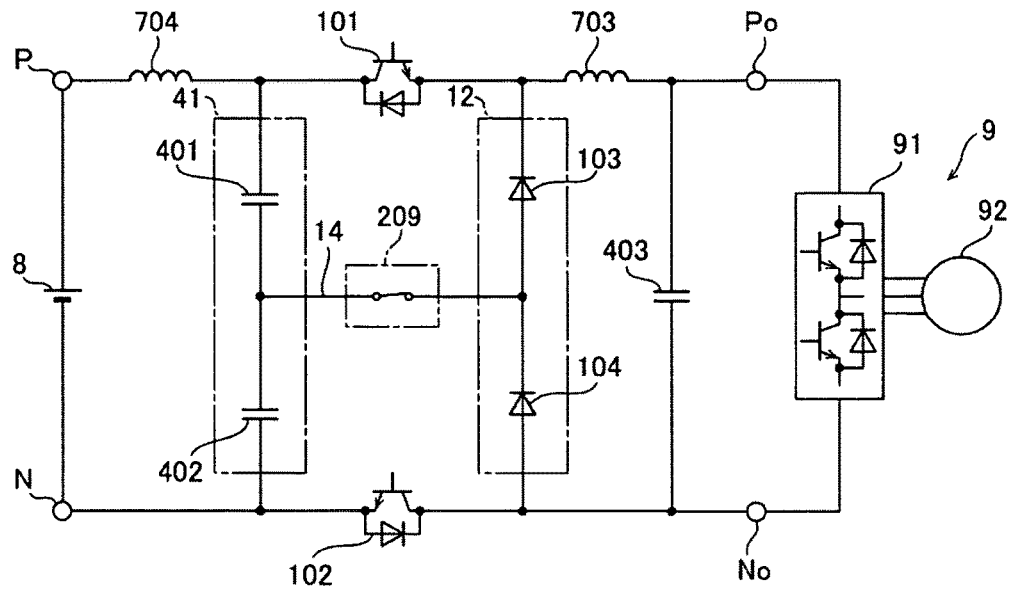
FIG. 1 is a circuit configuration diagram of a three-level chopper apparatus according to a first embodiment of the present invention.
Figure 2:
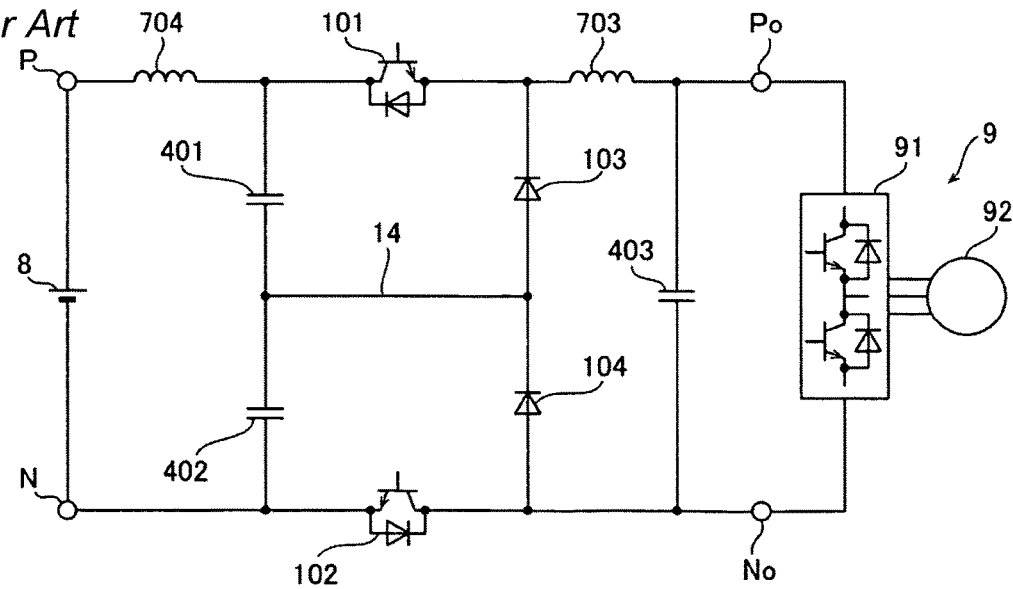
FIG. 2 is a circuit configuration diagram of a three-level chopper apparatus (three-level step-down chopper circuit)
Figure 3:
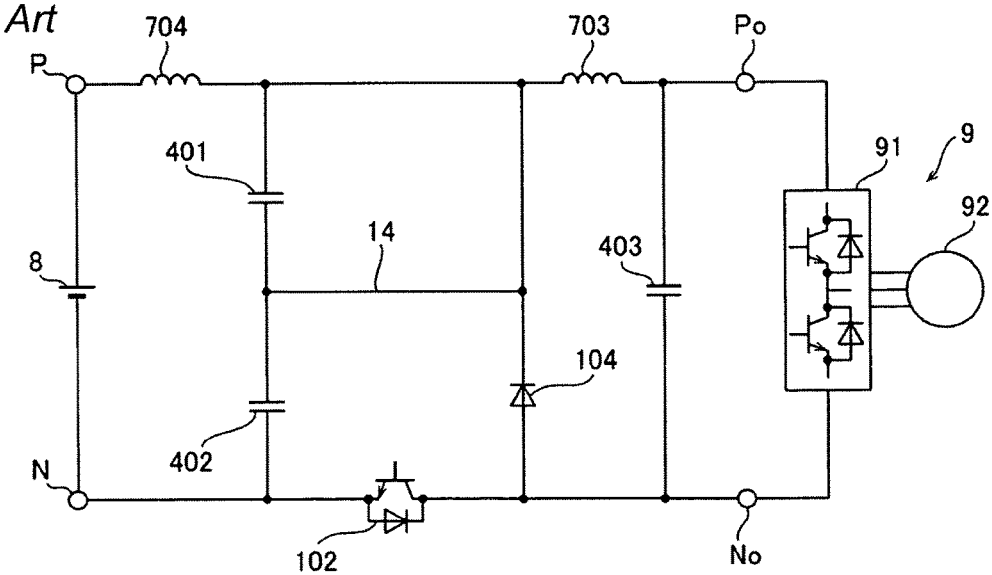
FIG. 3 is an equivalent circuit in the case where one switch and one diode have a short circuit failure in the three-level step-down chopper circuit in FIG. 2.

According to the first embodiment, the three-level chopper apparatus includes a direct-current power supply 8, switches 101 and 102, diodes 103 and 104, capacitors 401, 402, and 403, a reactor 704, a reactor (chopper reactor) 703, a connection path 14, and a protection switch 209, as shown in FIG. 1. The protection switch 209 is an example of the "bidirectional protection switch" in the claims.

The switch 101, the diode 103, the diode 104, the switch 102, the capacitor 402, and the capacitor 401 are connected in series to each other in this order in a loop. The direct-current power supply 8 is connected in parallel between a connection point between the capacitor 401 and the switch 101 and a connection point between the switch 102 and the capacitor 402 through the reactor 704. The capacitor 403 is connected in parallel between a connection point between the diode 103 and the switch 101 and a connection point between the switch 102 and the diode 104 through the reactor 703.

The connection path 14 connects a connection point between the diode 103 and the diode 104 and a connection point between the capacitor 401 and the capacitor 402. According to the first embodiment, the protection switch 209 is controllable to change a current pathway through which an overvoltage is applied to the capacitor 402 or the capacitor 401 to a current pathway through which no overvoltage is applied when at least one of the switch 101 and the diode 103 or at least one of the switch 102 and the diode 104 has a failure. The protection switch 209 is connected in series to the connection path 14.

The diode 103 and the diode 104 constitute a diode series circuit 12. The capacitor 401 and the capacitor 402 constitute a capacitor series circuit 41.

Output ends Po and No are connected with a load 9 including an inverter 91 and an electric motor 92.

(Operation of (Control Method for) Three-Level Chopper Apparatus)

The operation of (control method for) the three-level chopper apparatus is now described in detail.

Figure 6:
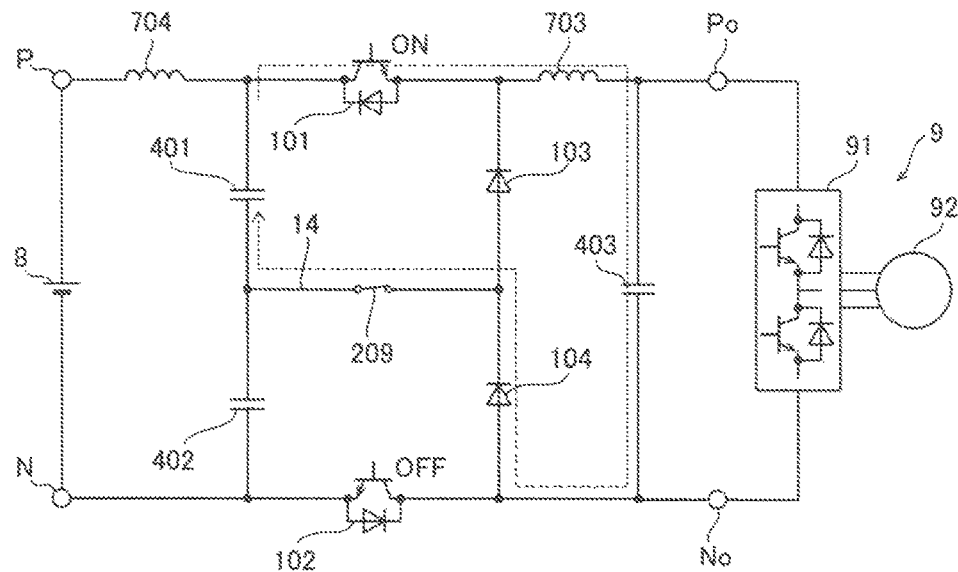
FIG. 6 illustrates one of the states of the three-level step-down chopper circuit during operation and a mode in which a first switch is in an on-state and a second switch is in an off-state.
Figure 7:
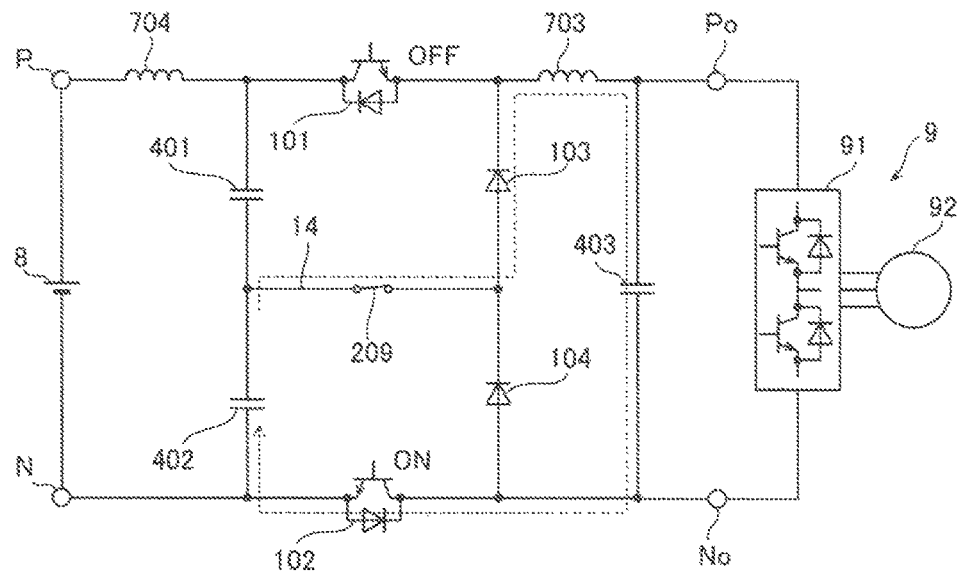
FIG. 7 illustrates one of the states of the three-level step-down chopper circuit during operation and a mode in which the second switch is in an on-state and the first switch is in an off-state inversely to FIG. 6.
Figure 8:
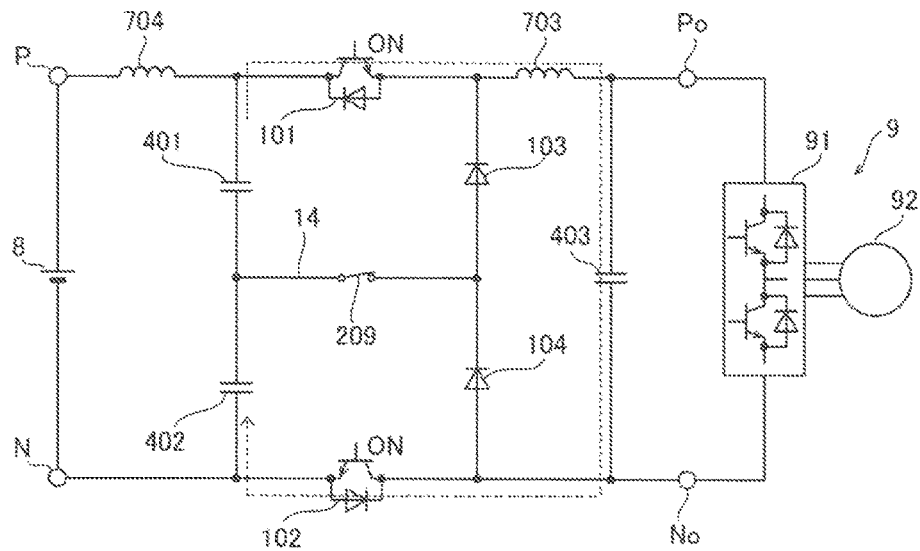
FIG. 8 illustrates one of the states of the three-level step-down chopper circuit during operation and a mode in which both the switches are in the on-state.

During the normal operation of the three-level chopper apparatus, the protection switch 209 conducts. When the switch 101 is in an on-state and the switch 102 is in an off-state, as shown in FIG. 6, a current pathway starting from the capacitor 401, sequentially passing through the switch 101, the reactor 703, the capacitor 403, the diode 104, and the protection switch 209, and returning to the capacitor 401 is formed. When the switch 101 is in an off-state and the switch 102 is in an on-state, as shown in FIG. 7, a current pathway starting from the capacitor 402, sequentially passing through the protection switch 209, the diode 103, the reactor 703, the capacitor 403, and the switch 102, and returning to the capacitor 402 is formed. When the switch 101 is in the on-state and the switch 102 is in the on-state, as shown in FIG. 8, a current pathway starting from the capacitor 401, sequentially passing through the switch 101, the reactor 703, the capacitor 403, and the switch 102, and returning to the capacitor 402 is formed. When the switch 101 is in the off-state and the switch 102 is in the off-state, as shown in FIG. 9, the capacitor 403 is separated from the capacitors 401 and 402 not to be charged, and a current flowing in the reactor 703 continues to flow in a pathway sequentially passing through the capacitor 403, the diode 104, and the diode 103 and returning to the reactor 703.

When the output voltage (the voltage of the capacitor 403) is not less than the voltages of the capacitors 401 and 402 on an input side and less than the sum of the voltages of the capacitors 401 and 402, the switches 101 and 102 are switched so that the operation in FIG. 6, the operation in FIG. 8, the operation in FIG. 7, and the operation in FIG. 8 are repeated in this order. When the output voltage is less than the voltages of the capacitors 401 and 402 on the input side, the switches 101 and 102 are switched so that the operation in FIG. 6, the operation in FIG. 9, the operation in FIG. 7, and the operation in FIG. 9 are repeated in this order.

Figure 9:
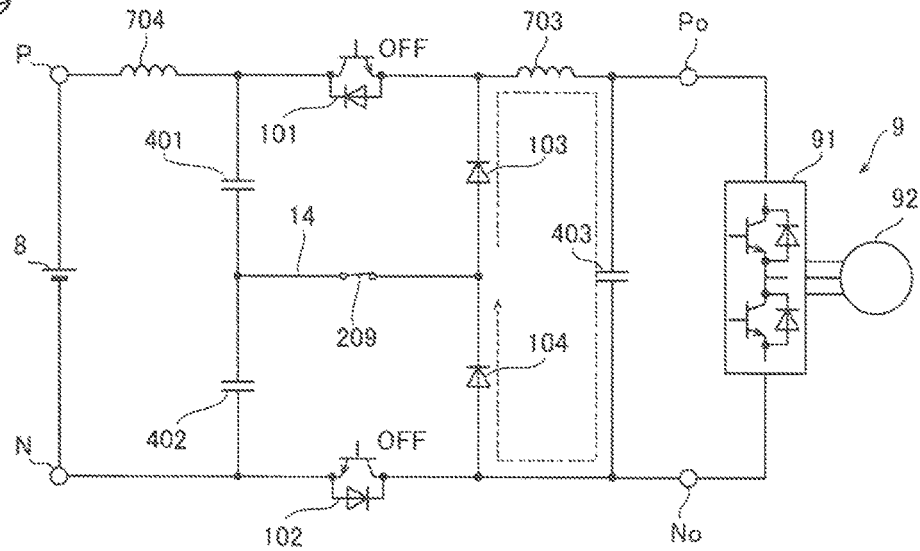
FIG. 9 illustrates one of the states of the three-level step-down chopper circuit during operation and a mode in which both the switches are in the off-state.

During periods in FIGS. 8 and 9, no current flows in a portion in which the protection switch 209 is provided, and hence the protection switch 209 may be disconnected during these periods. In modes in FIGS. 6 and 7, the protection switch 209 needs to be in an on-state. When the protection switch 209 is turned off, an appropriate switching period is provided from the start of switching of the switches 101 and 102 not to influence the operation of the three-level chopper apparatus.

When the pathway in FIG. 6, the pathway in FIG. 9, the pathway in FIG. 7, and the pathway in FIG. 9 are repeated in this order, the same operation can be performed by switching the pathway by the protection switch 209 instead of switching the pathway at the switching timing of the switches 101 and 102. The state in FIG. 6 can be changed to the state (pathway) in FIG. 9 by turning off the protection switch 209 instead of turning off the switch 101. Then, when the switch 101 to which no current flows is turned off, the switch 102 is turned on, and the protection switch 209 is turned on, the state (pathway) in FIG. 7 is obtained. However, in this case, the voltages of both the capacitors 401 and 402 are applied to the switches 101 and 102, and hence the switches 101 and 102 are required to withstand a higher voltage.

When the operation in FIG. 6, the operation in FIG. 8, the operation in FIG. 7, and the operation in FIG. 8 are repeated in this order, the pathway is not switched by the protection switch 209, but the switching by the switches 101 and 102 is required. Switching from FIG. 8 to FIG. 7 is performed only by turning off the switch 101 when the protection switch 209 is in the on-state. Even if the protection switch 209 is switched in the state of FIG. 8, the current pathway is not changed. If the switch 101 is turned off when the protection switch 209 is in an off-state, the same pathway as that in FIG. 9 is obtained.

When the apparatus is normally stopped, the load 9 is separated from the three-level chopper apparatus while the inverter 91 is turned off, and the switches 101 and 102 are turned off. A resonant circuit including the direct-current power supply 8, the reactor 704, and the capacitors 401 and 402 makes the voltages of the capacitors 401 and 402 higher than those during the normal operation. The capacitors 401 and 402 are designed to withstand a voltage higher than the voltages reached at this time. A current flowing in the reactor 703 becomes a resonant current between the reactor 703 and the capacitor 403, and continues to flow sequentially through the diode 104 and the diode 103 in this order so that the capacitor 403 is charged with the current to a voltage higher than normal. When the current of the reactor 703 reaches zero, the voltage of the capacitor 403 is held by the diodes 103 and 104.

(Behaviors of Three-Level Chopper Apparatus in Event of Failure of Switch and/or Diode)

The behaviors of the three-level chopper apparatus in the event of a short circuit failure of the switch and/or the diode are now described in detail.

Figure 4:
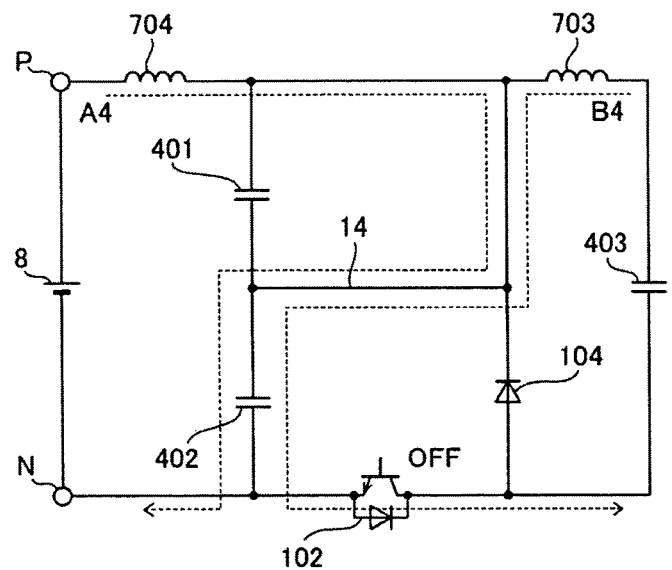
FIG. 4 is an equivalent circuit in the case where a load is separated from the chopper circuit in FIG. 3 and a switch of an unbroken chopper is turned off.

When a diode 103 and one switch 101 have a short circuit failure in a conventional three-level step-down chopper having no protection switch 209, a load 9 is separated and the other switch 102 is disconnected to obtain a circuit in FIG. 4. In this case, a series resonant circuit including a capacitor 402, a reactor 704, and a direct-current power supply 8, shown by a pathway A4, is formed, and the voltage of the capacitor 402 becomes higher than that of the direct-current power supply 8. During the normal operation, the voltage of the capacitor 402 is half the voltage of the direct-current power supply 8, and hence if this failure is generated, the voltage of the capacitor 402 may reach three times or more the voltage during the normal operation. Therefore, a risk of breakdown of the capacitor 402 due to an overvoltage is increased, and the capacitor 402 is required to withstand a voltage much higher than the voltage during the normal operation in order to prevent the breakdown.

Figure 5:
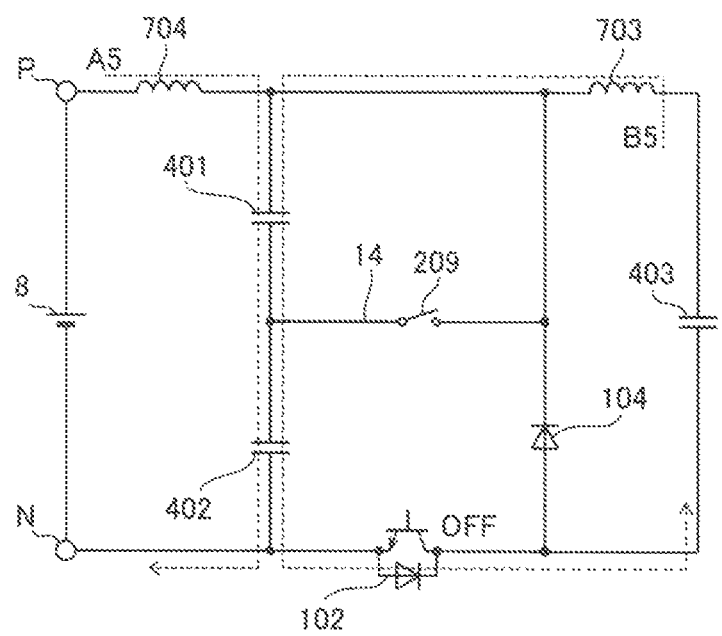
FIG. 5 is an equivalent circuit in the case where a load is separated and an unbroken switch and a bidirectional protection switch are turned off when a diode and a switch of one chopper have a short circuit failure in the circuit in FIG. 1.

According to the first embodiment, when the diode 103 and one switch 101 have a short circuit failure, the load 9 is separated and the protection switch 209 is disconnected simultaneously with disconnection of the other switch 102 to obtain a circuit in FIG. 5. In this case, a series resonant circuit including the two capacitors 401 and 402, the reactor 704, and the direct-current power supply 8, shown by a pathway A5, is formed, and the sum of the voltages of the two capacitors 401 and 402 becomes higher than that of the direct-current power supply 8. However, the two capacitors share the voltage, and hence the voltage of the capacitor 402 is reduced as compared with the case where no disconnection of the protection switch 209 is involved.

When the protection switch 209 is not disconnected, a current flows through a pathway B4 along a dotted arrow in FIG. 4 if the voltage of the capacitor 402 on the input side is lower than that of the capacitor 403 on an output side. When the protection switch 209 is disconnected, on the other hand, the pathway no longer exists. When the protection switch 209 is disconnected, a current may flow through a pathway, in which a current circulates through the switch 102, shown by a dotted arrow B5 in FIG. 5 instead if the sum of the voltages of the capacitors 401 and 402 on the input side is lower than the voltage of the capacitor 403 on the output side.

Figure 10:
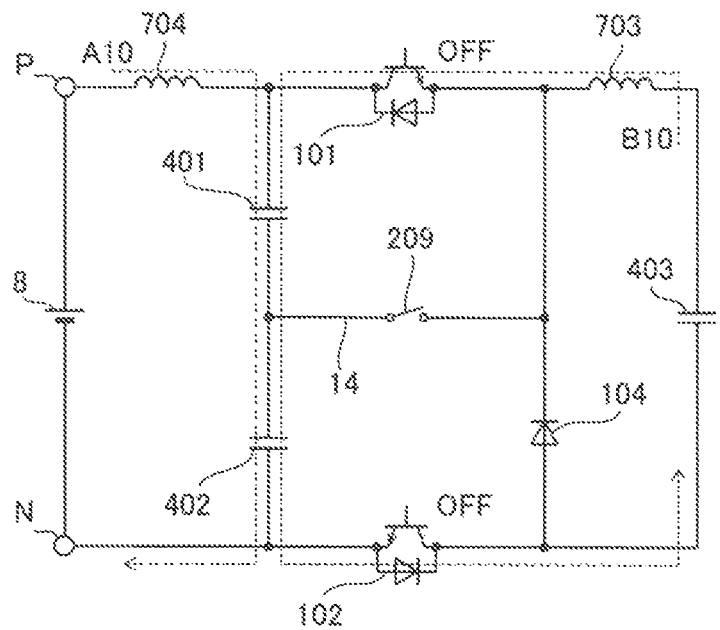
FIG. 10 illustrates an equivalent circuit in the case where the load is separated and the unbroken switch and the bidirectional protection switch are turned off when one diode has a short circuit failure in the circuit in FIG. 1.

When the diode 103 of the three-level chopper apparatus has a short circuit failure, the load 9 is separated and the protection switch 209 is disconnected simultaneously with disconnection of the other switch 102 to obtain an equivalent circuit in FIG. 10. In this case, a series resonant circuit including the two capacitors 401 and 402, the reactor 704, and the direct-current power supply 8, shown by a pathway A10 along a dashed arrow, is formed. The sum of the voltages of the two capacitors 401 and 402 becomes higher than that of the direct-current power supply 8.

Figure 12:
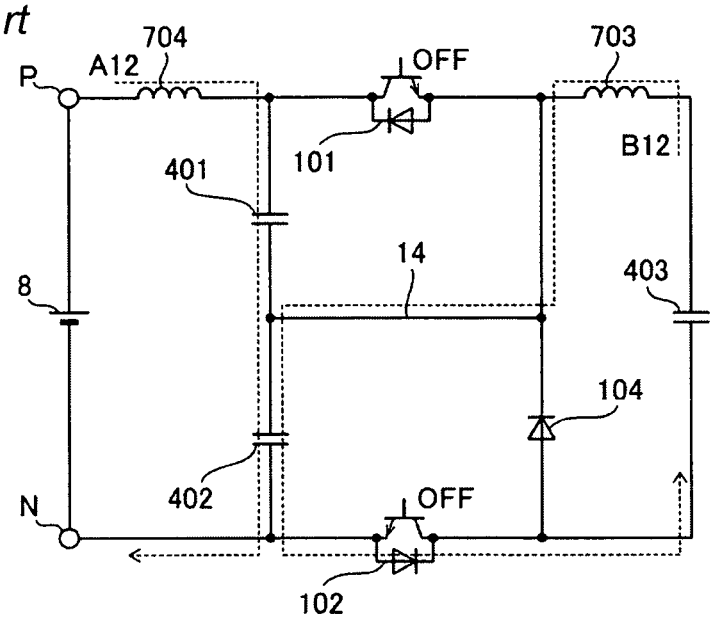
FIG. 12 illustrates an equivalent circuit in the case where the load is separated and the unbroken switch is turned off when one diode has a short circuit failure in the circuit in FIG. 2.

When the protection switch 209 is not disconnected or in the case of a three-level step-down chopper according to a comparative example, provided with no protection switch 209, a series resonant circuit including the two capacitors 401 and 402, the reactor 704, and the direct-current power supply 8, shown by a pathway A12 along a dashed arrow, is formed also in this case, as shown in FIG. 12. The sum of the voltages of the two capacitors 401 and 402 becomes higher than that of the direct-current power supply. Therefore, when only the diode 103 has a short circuit failure, current flow only in one capacitor 402 on the inside side can be prevented by both turning off the protection switch 209 and allowing the protection switch 209 to remain in the on-state, and hence either can be selected.

When the protection switch 209 is not disconnected, a current flows through a pathway B12 along a dotted arrow in FIG. 12 if the voltage of the capacitor 402 on the input side is lower than that of the capacitor 403 on the output side. When the protection switch 209 is disconnected, on the other hand, the pathway B12 no longer exists. When the protection switch 209 is disconnected, a current may flow through a pathway B10 along a dotted arrow in FIG. 10 instead if the sum of the voltages of the capacitors 401 and 402 on the input side is lower than the voltage of the capacitor 403 on the output side.

Figure 11:
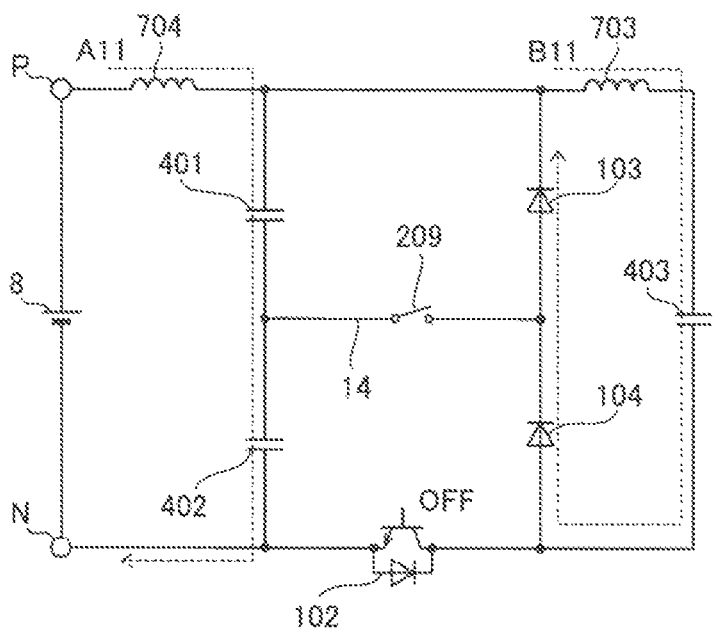
FIG. 11 illustrates an equivalent circuit in the case where the load is separated and the unbroken switch and the bidirectional protection switch are turned off when one switch has a short circuit failure in the circuit in FIG. 1.

When one switch 101 of the three-level chopper apparatus has a short circuit failure, the load 9 is separated and the protection switch 209 is disconnected simultaneously with disconnection of the other switch 102 to obtain an equivalent circuit in FIG. 11. In this case, a series resonant circuit including the two capacitors 401 and 402, the reactor 704, and the direct-current power supply 8, shown by a pathway A11 along a dashed arrow, is formed. The sum of the voltages of the two capacitors 401 and 402 becomes higher than that of the direct-current power supply.

Figure 13:
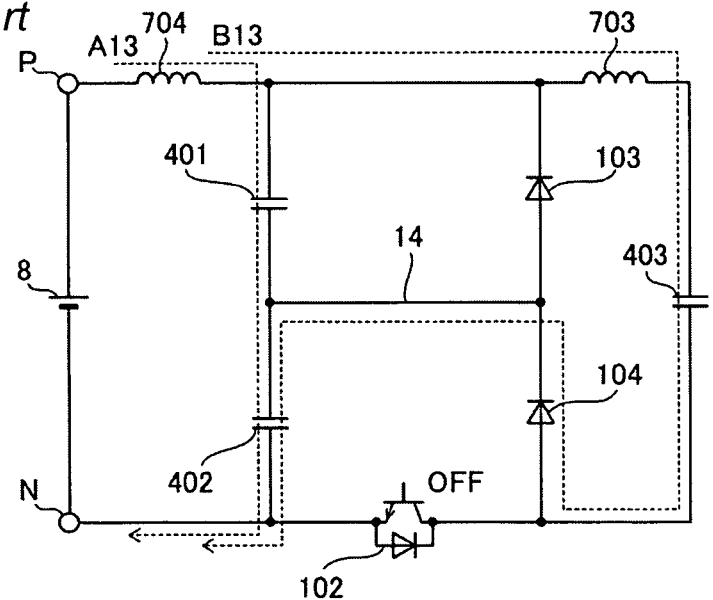
FIG. 13 illustrates an equivalent circuit in the case where the load is separated and the unbroken switch is turned off when one switch has a short circuit failure in the circuit in FIG. 2.

When the protection switch 209 is not disconnected or in the case of the three-level step-down chopper according to the comparative example, a series resonant circuit including the two capacitors 401 and 402, the reactor 704, and the direct-current power supply 8, shown by a pathway A13 along a dashed arrow, is formed also in this case, as shown in FIG. 13. The voltage of the capacitor 401 is equal to the voltages of the reactor 703 and the capacitor 403, and hence a current also flows in a resonant circuit including the direct-current power supply 8, the reactor 703, the reactor 704, the capacitor 403, and the capacitor 402, shown by a pathway B13. The sum of the voltages of the two capacitors 401 and 402 becomes higher than that of the direct-current power supply. Therefore, when only the switch 101 has a short circuit failure, current flow only in one capacitor 402 on the inside side can be prevented by both turning off the protection switch 209 and allowing the protection switch 209 to remain in the on-state, and hence either can be selected.

When the protection switch 209 is disconnected, the resonant circuit shown by the pathway B13 along a dotted arrow in FIG. 13, established when the protection switch 209, is not disconnected, no longer exists. The current flowing in the reactor 703 flows in the capacitor 403 while resonating with the capacitor 403, as shown by a pathway B11 in FIG. 11, and eventually stops flowing. Thus, the current flowing from the input side to the capacitor 402 through the capacitor 403 on the output side no longer exists, and the charge accumulated in the capacitor 402 is reduced so that the voltage is reduced.

The charge of the capacitor 401 is not discharged because the diode 103 is provided. Thus, the voltage of the capacitor 403 on the output side is not raised above the sum of the voltages of the capacitor 401 and the capacitor 402 on the input side, and no current flows from the capacitor 403 on the output side to the capacitor 401 and the capacitor 402 on the input side. When the protection switch 209 is not disconnected, the diode 103 and the switch 102 keep the voltages of the capacitor 401 and the capacitor 402 on the input side. When the protection switch 209 is disconnected, on the other hand, a current flows in the diode 103 during the flow of the resonant current in the reactor 703 and the capacitor 403 through the pathway B11, and hence the switch 102 keeps all the voltages of both the capacitors 401 and 402. Thus, it is necessary to pay attention to the withstanding voltage of the device.

As described above, when the diode 103 and the switch 101 have a short circuit failure, an overvoltage in the capacitor 402 resulting from configuring the series resonant circuit by only the capacitor 402, the reactor 704, and the direct-current power supply 8 is allowed to be applied to the two capacitors 401 and 402 by disconnecting the protection switch 209 so that a voltage to be applied to each capacitor can be reduced.

As the switches 101 and 102, which are devices to operate the three-level chopper apparatus, semiconductor devices such as MOSFETs or IGBTs can be used. Furthermore, as the switches 101 and 102, SiC-MOSFETs may be used.

As the diodes 103 and 104, Si (silicon)-pn diodes, SiC (silicon carbide)-SB diodes, MOSFETs that perform synchronous rectification, body diodes, or ones obtained by connecting these in parallel can be used.

In the above description, the device(s) having a short circuit failure is the switch 101 and/or the diode 103, but also when the switch 102 and/or the diode 104 have a short circuit failure, the same behaviors are exhibited, replacing the capacitor 402 by the capacitor 401. Accordingly, its description is omitted. Also in the following embodiments, the behaviors exhibited when the switch 101 and/or the diode 103 have a short circuit failure are described as examples, and the description about the behaviors exhibited when the switch 102 and/or the diode 104 have a short circuit failure is omitted unless otherwise required. When the switch 101 and the diode 103 have a short circuit failure, the voltage of the capacitor 402 is the highest, and hence also in the following embodiments, the behavior exhibited when the switch 101 and the diode 103 have a short circuit failure is mainly described.

In the above description, back flow of a current from the sides of the capacitors 401 and 402, the voltages of which are raised due to resonance, to the side of the direct-current power supply 8 is not taken into consideration. In an actual product, back flow of a current to the direct-current power supply 8 is often prevented by connecting diodes (not shown) in series, and hence the back flow to the direct-current power supply 8 is not discussed in order to simplify the discussion. Even if a current flows back to the side of the direct-current power supply 8, an overvoltage may first occur in the capacitors 401 and 402 on the input side due to resonance, and hence the above discussion holds.

Second Embodiment

A three-level chopper apparatus according to a second embodiment is now described.

Figure 14:
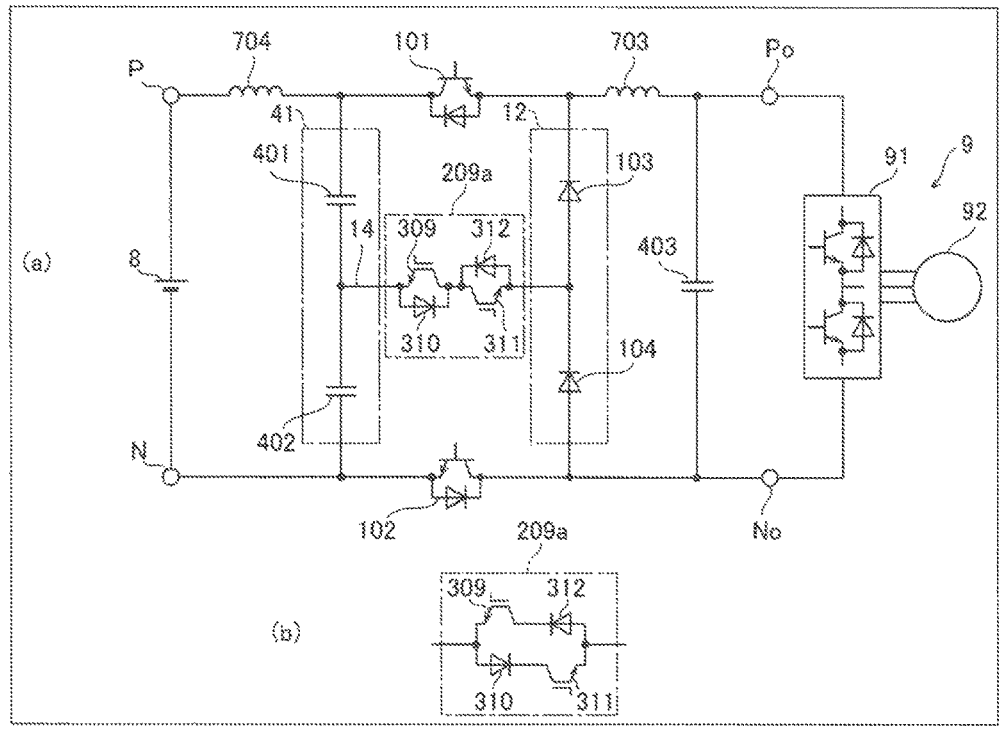
FIG. 14 is a circuit configuration diagram of a three-level chopper apparatus according to a second embodiment of the present invention.
Figure 14:

According to the second embodiment, a switch including an IGBT and a diode connected in anti-parallel to each other is arranged in anti-series as a bidirectional protection switch 209a placed in a connection path 14, as shown in view (a) of FIG. 14. The protection switch 209a may be constructed by connecting, in anti-parallel to each other, a module having an IGBT 309 and a diode 312 connected in anti-series to each other and a module having an IGBT 311 and a diode 310 connected in anti-series to each other, as shown in view (b) of FIG. 14, and the same control as that performed on the structure shown in view (a) of FIG. 14 described below is performed so that the same effect is obtained. The remaining structures of the three-level chopper apparatus according to the second embodiment are similar to those of the three-level chopper apparatus according to the aforementioned first embodiment. The protection switch 209a is an example of the "bidirectional protection switch" in the claims.

According to the second embodiment, during the normal operation of the three-level chopper apparatus, gates of the IGBTs 309 and 311 are on. When a switch 101 is in an on mode and a switch 102 is in an off mode, as shown in FIG. 6, it is required that the gate of the IGBT 309 becoming forward biased be turned on to allow a current to flow therein. On the other hand, the gate of the IGBT 311 becoming reversely biased may be turned off. When the switch 101 is in an off mode and the switch 102 is in an on mode, as shown in FIG. 7, it is required that the gate of the IGBT 311 becoming forward biased be turned on to allow a current to flow therein. On the other hand, the gate of the IGBT 309 becoming reversely biased may be turned off. During a period in which no current flows in the protection switch 209a as shown in FIGS. 8 and 9, the gates of the two IGBTs 309 and 311 may be turned off. Also during the normal operation, a risk of charge accumulation in the gates of the IGBTs 309 and 311 can be reduced by turning off these gates in a period in which the operation of the three-level chopper apparatus is not influenced. When the gates of the IGBTs 309 and 311 are turned off, an appropriate dead time is provided from the start of switching of the switches 101 and 102 not to influence the operation of the three-level chopper apparatus.

When the switch 101 and a diode 103 have a short circuit failure, the connection path 14 can be disconnected by turning off the gates of the IGBTs 309 and 311. Thus, only a capacitor 402 resonates so that the voltage of the capacitor 402 can be prevented from becoming higher than that of a direct-current power supply 8. It is particularly necessary to turn off the gate of the IGBT 309 becoming forward biased, but both the IGBTs 309 and 311 may be turned off so that no problem occurs.

Although SiC-SB diodes may be used as the diodes 310 and 312 constituting the protection switch 209a, Si-pn diodes are used with a lower loss. During the normal operation, the reverse bias is several volts substantially equal to the saturation voltages of the IGBTs 309 and 311 at most even in a transient state, and no bias is applied in a steady state when a current to the diodes 310 and 312 are interrupted. Thus, almost no reverse recovery loss is generated. Therefore, even when the SiC-SB diodes are used, no reverse recovery loss is generated, but the on-voltages thereof are higher than those of the Si-pn diodes so that a loss is increased.

When the SiC-SB diodes are used as the diodes 310 and 312 constituting the protection switch 209a, the forward recovery voltage can be reduced as compared with the case where the Si-pn diodes are used. Each time the diodes 310 and 312 switch the switches 101 and 102 of the three-level chopper apparatus, on/off of the protection switch 209a is also switched. When the protection switch 209a is turned on, the diode 310 or 312 is turned on from the state in which no bias is applied, and when the protection switch 209a is turned off, one of the diodes 310 and 312 is momentarily turned on from the state in which the same is reversely biased following transient response in which the other of the diodes 310 and 312 is turned off. When the forward recovery voltages of the diodes 310 and 312 are small at the time of turning on the diodes 310 and 312, the voltage ripple is reduced so that the noise can be reduced. When the diodes 310 and 312 are constructed by placing the SiC-SB diodes and the Si-pn diodes in parallel, both the forward recovery voltage and the on-voltage can be reduced. More specifically, a low noise and a low loss can be achieved.

The three-level chopper apparatus performs the same operation also when a MOSFET or a bipolar transistor is used instead of the IGBT 309 and 311 constituting the protection switch 209a so that the same effects are obtained. Furthermore, a SiC-MOSFET may be used.

Third Embodiment

A three-level chopper apparatus according to a third embodiment is now described.

Figure 15:
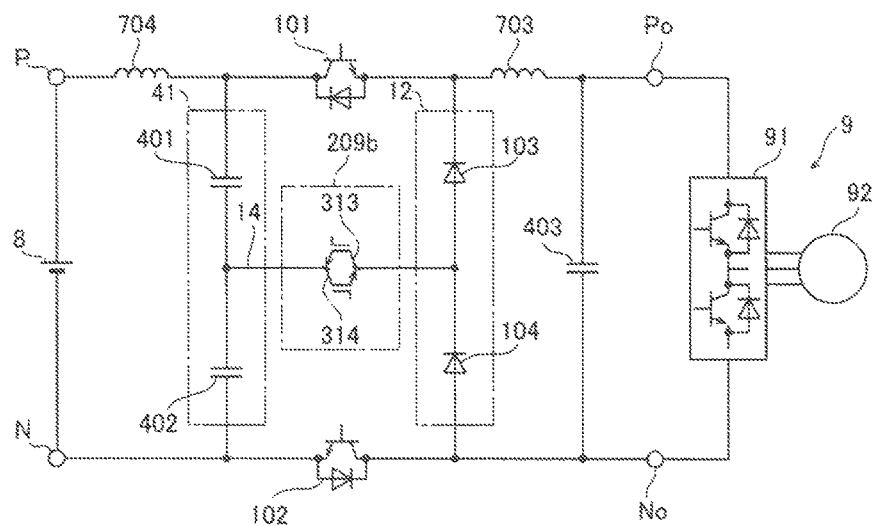
FIG. 15 is a circuit configuration diagram of a three-level chopper apparatus according to a third embodiment of the present invention.

According to the third embodiment, reverse blocking IGBTs 313 and 314 connected in anti-parallel to each other are arranged as a bidirectional protection switch 209b placed in a connection path 14, as shown in FIG. 15. The remaining structures of the three-level chopper apparatus according to the third embodiment are similar to those of the three-level chopper apparatus according to the aforementioned first embodiment. According to the aforementioned second embodiment, a current flows in two types of devices of the IGBT and the diode when the current flows in the connection path 14, but a loss can be reduced by allowing a current to flow in one type of device. The protection switch 209b is an example of the "bidirectional protection switch" in the claims.

During the normal operation of the three-level chopper apparatus, gates of the reverse blocking IGBTs 313 and 314 are on. In a mode in which a current flows in the connection path 14, i.e. in a mode shown in each of FIGS. 6 and 7, it is required that the gate of the reverse blocking IGBT becoming forward biased be turned on to allow a current to flow therein. On the other hand, the gate of the reverse blocking IGBT becoming reversely biased may be turned off. When a switch 101 is in an on mode and a switch 102 is in an off mode, as shown in FIG. 6, it is required that the gate of the reverse blocking IGBT 313 becoming forward biased be turned on to allow a current to flow therein. On the other hand, the gate of the reverse blocking IGBT 314 becoming reversely biased may be turned off. When the switch 101 is in an off mode and the switch 102 is in an on mode, as shown in FIG. 7, it is required that the gate of the reverse blocking IGBT 314 becoming forward biased be turned on to allow a current to flow therein. On the other hand, the gate of the reverse blocking IGBT 313 becoming reversely biased may be turned off.

During a period in which no current flows in the connection path 14 as shown in FIGS. 8 and 9, the gates of the two reverse blocking IGBTs 313 and 314 may be turned off. Also during the normal operation, a risk of charge accumulation in the gates of the reverse blocking IGBTs 313 and 314 can be reduced by turning off these gates in a period in which the operation of the three-level chopper apparatus is not influenced. When the gates of the reverse blocking IGBTs 313 and 314 are turned off, an appropriate switching period is provided from the start of switching of the switches 101 and 102 not to influence the operation of the three-level chopper apparatus.

When the switch 101 and a diode 103 of the three-level chopper apparatus have a short circuit failure, the connection path 14 can be disconnected by turning off the gates of both the reverse blocking IGBTs 313 and 314. Furthermore, when the gate of the reverse blocking IGBT 313 is turned off and the gate of the reverse blocking IGBT 314 becoming reversely biased is turned on, a leakage current of the reverse blocking IGBT 314 becoming reversely biased can be further reduced, which is more preferable. When a switch failure is generated, control of determining which of the gates of the reverse blocking IGBTs 313 and 314 is turned on or off can be performed by incorporating a mechanism configured to detect whether the broken device is the switch 101, the switch 102, the diode 103, or a diode 104.

Fourth Embodiment

A three-level chopper apparatus according to a fourth embodiment is now described.

Figure 16:
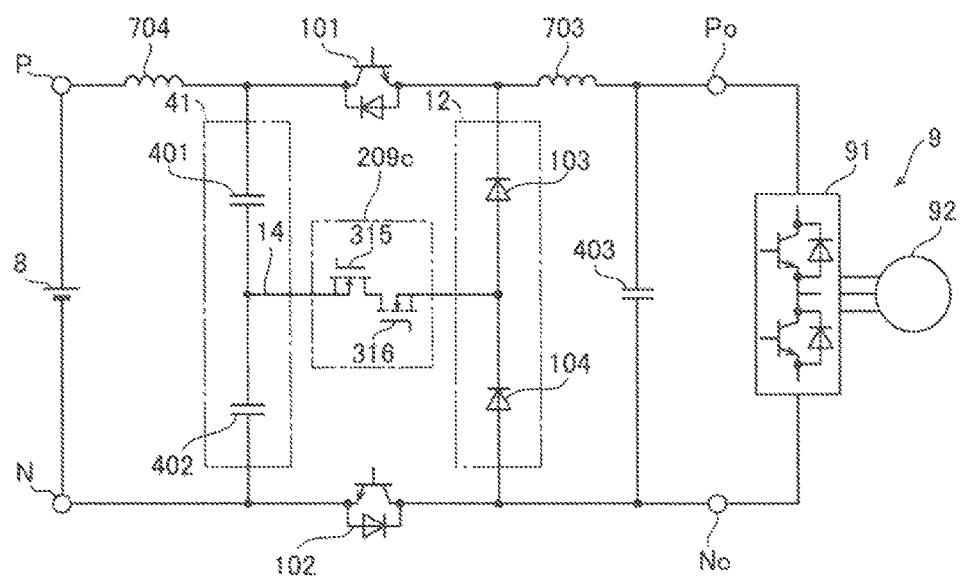
FIG. 16 is a circuit configuration diagram of a three-level chopper apparatus according to a fourth embodiment of the present invention.

According to the fourth embodiment, MOSFETs are arranged in anti-series as a protection switch 209c placed in a connection path 14 in the three-level chopper apparatus, as shown in FIG. 16. The protection switch 209c is an example of the "bidirectional protection switch" in the claims.

During the normal operation of the three-level chopper apparatus, gates of both MOSFETs 315 and 316 are on. In a mode in which a current flows in the connection path 14, i.e. in a mode shown in each of FIGS. 6 and 7, the gate of the MOSFET becoming forward biased is turned on to allow a current to flow therein. Furthermore, the gate of the MOSFET becoming reversely biased is also turned on to achieve synchronous rectification so that a low loss can be achieved.

When the gate of the MOSFET becoming reversely biased is turned off, a current flows in a body diode so that a loss is increased, which is not preferable. For application of diodes in an inverter or a chopper, it is necessary to provide a period in which a current flows in only a body diode by providing a dead time before and after switching not to cause a short circuit at the time of switching when synchronous rectification is utilized. For application in the present invention, on the other hand, it is not necessary to be concerned about this short circuit, and hence it is not necessary to provide a dead time in which a current flows in only a body diode.

During a period in which no current flows in the connection path 14 as shown in FIGS. 8 and 9, the gates of the two MOSFETs 315 and 316 may be turned off. Also during the normal operation, a risk of charge accumulation in the gates of the MOSFETs 315 and 316 can be reduced by turning off these gates in a period in which the operation of the three-level chopper apparatus is not influenced. When the gates of the MOSFETs 315 and 316 are turned off, an appropriate switching period is provided from the start of switching of switches 101 and 102 not to influence the operation of the three-level chopper apparatus. When synchronous rectification is used, the diode element can be reduced in number as compared with the case where modules having diodes in anti-parallel are used as in the second embodiment.

When the switch 101 and a diode 103 have a short circuit failure, the connection path 14 can be disconnected by turning off the gates of both the MOSFETs 315 and 316. It is particularly necessary to turn off the gate of the MOSFET 315 becoming forward biased, but it is safe to turn off both the MOSFETs 315 and 316, which facilitates control.

Even in the structure in which the diodes in anti-parallel are connected to the MOSFETs as in the second embodiment, synchronous rectification can be utilized by controlling the gates of the MOSFETs as described in this embodiment. Particularly in a SiC-MOSFET, the on-voltage is large even when synchronous rectification is used, and hence a low loss is achieved when the SiC-MOSFET and a Si-pn diode are placed in parallel.

Fifth Embodiment

A three-level chopper apparatus according to a fifth embodiment is now described.

Figure 17:
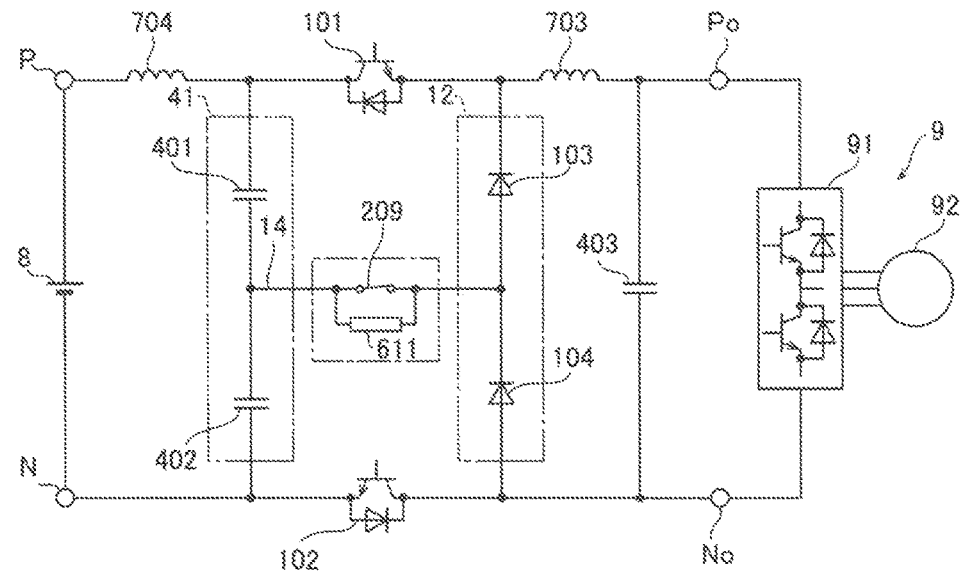
FIG. 17 is a circuit configuration diagram of a three-level chopper apparatus according to a fifth embodiment of the present invention.

According to the fifth embodiment, a bidirectional protection switch 209 and a resistance 611 provided in parallel to the protection switch 209 are arranged in a connection path 14, as shown in FIG. 17. The resistance 611 is an example of the "first resistance" in the claims.

During the normal operation of the three-level chopper apparatus, the protection switch 209 is allowed to conduct, and no current is allowed to flow in the resistance 611. A control method for this is similar to that of each of the first to fourth embodiments.

Figure 18:
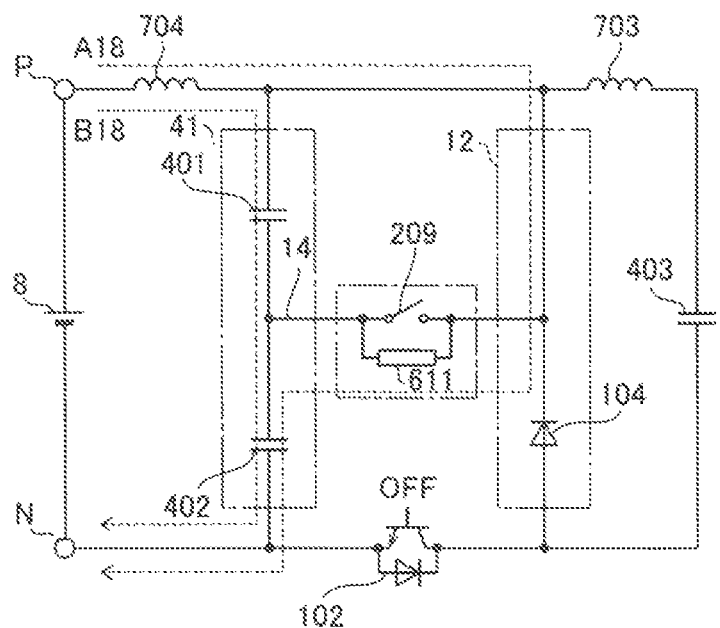
FIG. 18 illustrates an equivalent circuit in the case where a load is separated and an unbroken switch and a bidirectional protection switch are turned off when one diode and one switch have a short circuit failure in the circuit in FIG. 17.

When one switch 101 and a diode 103 of the three-level chopper apparatus have a short circuit failure, a load 9 is separated, and the protection switch 209 is disconnected simultaneously with disconnection of the other switch 102. In this state, an equivalent circuit shown in FIG. 18 is obtained. A damped oscillation circuit including the resistance 611 in which a current flows, shown by a pathway A18, and a resonant circuit including two capacitors 401 and 402, shown by a pathway B18, are formed.

The voltage of the capacitor 401 is equal to the voltage of the resistance 611 connected in parallel to the protection switch 209. When the voltage of a capacitor 403 on an output side is higher than the sum of the voltages of the capacitors 401 and 402 on an input side, a current pathway in which a current flows from the capacitor 403 on the output side to the capacitor 402 through the resistance 611 or the capacitor 401 and circulates through the switch 102 to the capacitor 403 is formed. When there is no current flowing from the capacitor 403 on the output side or a direct-current power supply 8 to the capacitor 402, the capacitor 401 is discharged through the resistance 611. According to the above behavior, a current (charge) flowing into the capacitor 402 is reduced as compared with the case where no protection switch 209 or resistance 611 is provided, and hence an increase in the voltage of the capacitor 402 is significantly reduced by providing the protection switch 209 and the resistance 611.

Figure 19:
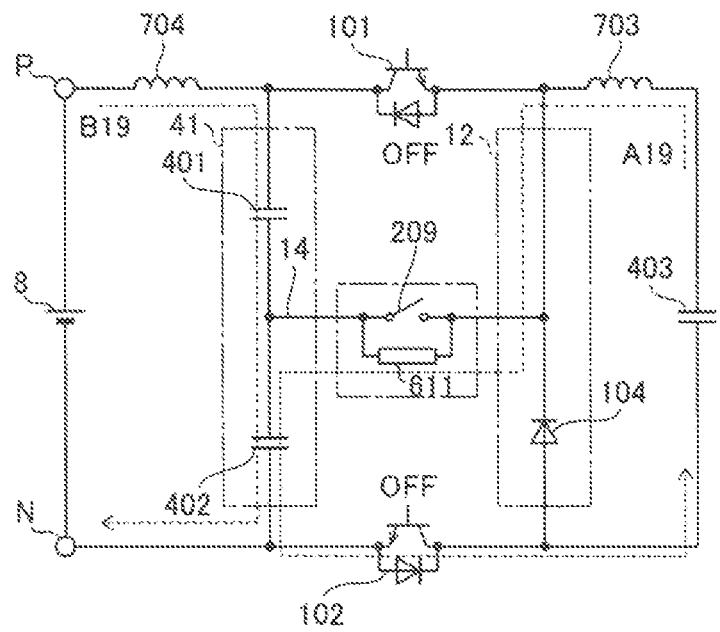
FIG. 19 illustrates an equivalent circuit in the case where the load is separated and the unbroken switch and the bidirectional protection switch are turned off when one diode has a short circuit failure in the circuit in FIG. 17.

When the diode 103 of the three-level chopper apparatus has a short circuit failure, the protection switch 209 can remain in an on-state, similarly to the case where no resistance 611 is connected. In this case, the same operation as that in FIG. 11 in the case where no protection switch 209 or resistance 611 is placed is performed. When the protection switch 209 is disconnected, an equivalent circuit in which the load 9 is separated and the other switch 102 is disconnected as shown in FIG. 19 is obtained. The capacitors 401 and 402 are charged through a pathway B19 with a current flowing in a reactor 704. It is required that the voltage of the capacitor 401 be shared by the switch 101 and the resistance 611, and hence when the voltage of the capacitor 403 on the output side is higher than that of the capacitors on the input side and a current flows to the capacitors on the input side, a current flows into the capacitor 402 on the input side through the resistance 611, as shown by a pathway A19. This current is smaller as compared with the case where no protection switch 209 is placed, and hence the voltage of the capacitor 402 is reduced. When no current flows from the capacitor 403 on the output side and a reactor 703 to the capacitors on the input side, the voltage is not changed even if the protection switch 209 and the resistance 611 are placed.

Figure 20:
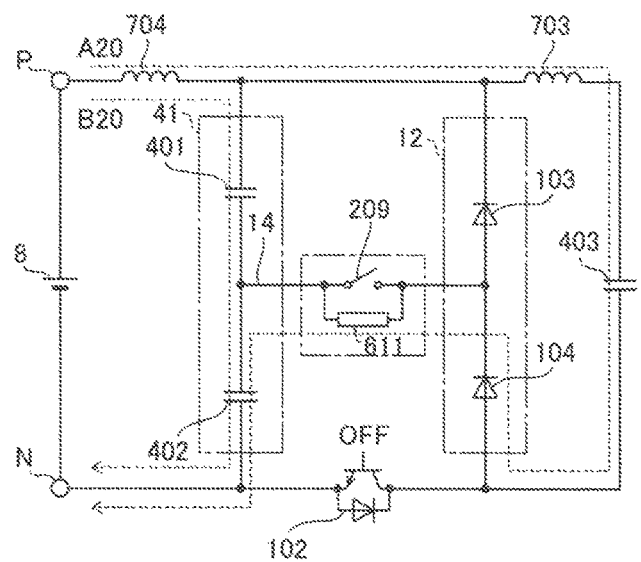
FIG. 20 illustrates an equivalent circuit in the case where the load is separated and the unbroken switch and the bidirectional protection switch are turned off when one switch has a short circuit failure in the circuit in FIG. 17.

When the switch 101 of the three-level chopper apparatus has a short circuit failure, the protection switch 209 can remain in the on-state, similarly to the case where no resistance 611 is connected. In this case, the same operation as that in FIG. 13 in the case where no protection switch 209 or resistance 611 is placed is performed. When the bidirectional protection switch 209 is disconnected, an equivalent circuit in which the load 9 is separated and the other switch 102 is disconnected as shown in FIG. 20 is obtained. The capacitor 402 is charged through a pathway A20 passing through the reactor 703, the capacitor 403, a diode 104, and the resistance 611 and a pathway B20 passing through the capacitor 401 with a current flowing in the reactor 704. The pathway A20 exists even when no protection switch 209 or resistance 611 is placed, but this current is reduced because the resistance 611 is provided. Thus, the voltage of the capacitor 402 is reduced.

As described above, one having the protection switch 209 and the resistance 611 connected in parallel to each other is arranged in the connection path 14, whereby an overvoltage resulting from charging only one capacitor when the switch and/or the diode have a short circuit failure can be significantly reduced.

Sixth Embodiment

A three-level chopper apparatus according to a sixth embodiment is now described.

Figure 21:
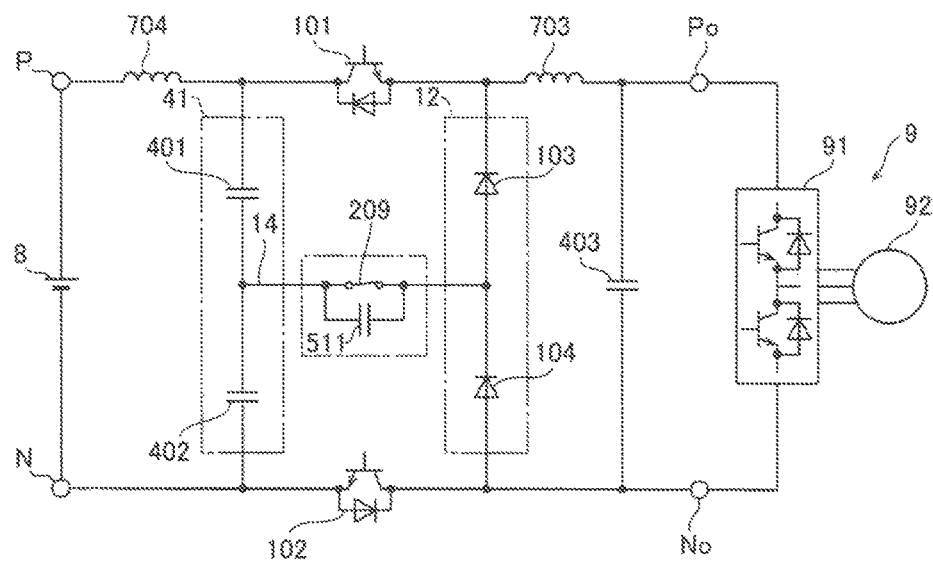
FIG. 21 is a circuit configuration diagram of a three-level chopper apparatus according to a sixth embodiment of the present invention.

According to the sixth embodiment, a protection switch 209 and a protection capacitor 511 provided in parallel to the protection switch 209 are arranged in a connection path 14, as shown in FIG. 21. The protection capacitor 511 is an example of the "first protection capacitor" in the claims.

During the normal operation of the three-level chopper apparatus, the protection switch 209 is allowed to conduct, and no current is allowed to flow in the protection capacitor 511. A control method for this is similar to that of each of the first to fourth embodiments.

Figure 22:
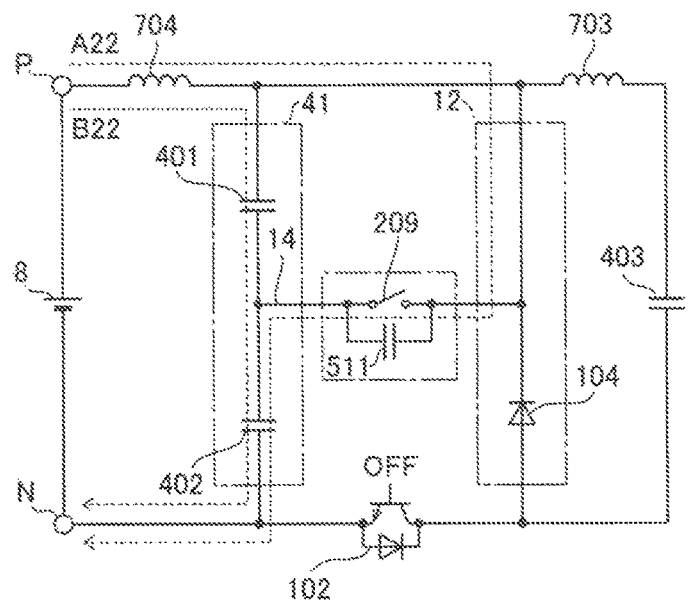
FIG. 22 illustrates an equivalent circuit in the case where a load is separated and an unbroken switch and a bidirectional protection switch are turned off when one switch and one diode have a short circuit failure in the circuit in FIG. 21.

When a diode 103 and a switch 101 have a short circuit failure, as shown in FIG. 22, the protection switch 209 is turned off. Thus, the protection capacitor 511 is inserted into a charging pathway A22 for a capacitor 402. The voltage of the protection capacitor 511 and the voltage of a capacitor 401 must be equal to each other, and hence a current also flows through a charging pathway B22. Although the sum of the voltage of the capacitor 402 and the voltage of the protection capacitor 511 is higher than the voltage of a direct-current power supply 8, the summed voltage is shared by the capacitor 402 and the protection capacitor 511, and hence an overvoltage in the capacitor 402 is prevented.

Seventh Embodiment

A three-level chopper apparatus according to a seventh embodiment is now described.

Figure 23:
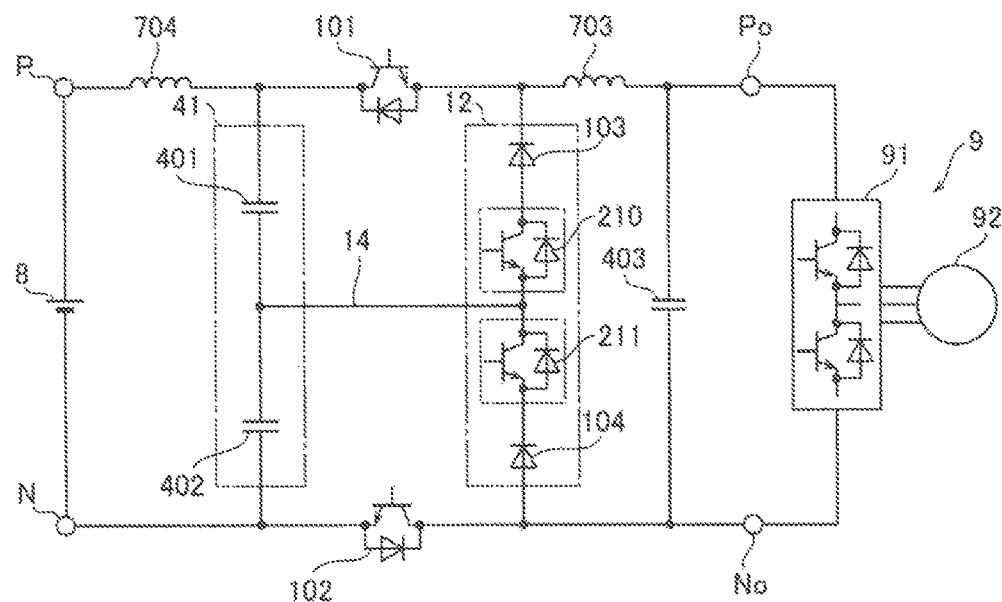
FIG. 23 is a circuit configuration diagram of a three-level chopper apparatus according to a seventh embodiment of the present invention.

According to the seventh embodiment, a diode 103 and a diode 104 are connected in series to a protection switch 210 and a protection switch 211, respectively, as shown in FIG. 23. The protection switches 210 and 211 are only required to disconnect a current from the side of the switch 101 to the side of the switch 102, and a current reversely from the side of the switch 102 to the side of the switch 101 may remain capable of circulating. The protection switch 210 and the protection switch 211 are examples of the "eleventh protection switch" and the "fourteenth protection switch" in the claims, respectively.

The protection switches 210 and 211 through which a current can circulate are provided, whereby during the normal operation, on/off of switches 101 and 102 is switched so that the same current pathways as those in FIGS. 6, 7, 8, and 9 according to the first embodiment can be obtained, and the output voltage can be converted into a direct-current voltage lower than the input voltage.

Figure 24:
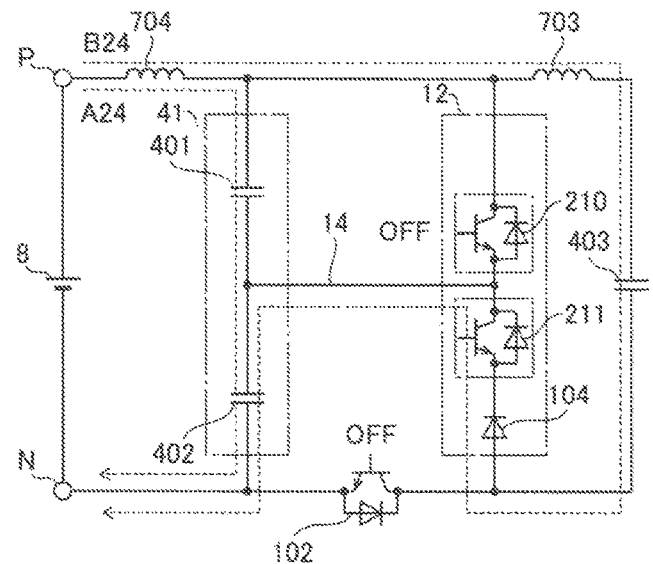
FIG. 24 illustrates an equivalent circuit in the case where a load is separated and an unbroken switch and a protection switch are turned off when one switch and one diode have a short circuit failure in the circuit in FIG. 23.

When the switch 101 and the diode 103 have a short circuit failure, a load 9 is separated and the switch 102 is disconnected to obtain an equivalent circuit in FIG. 24. This is equivalent to a circuit in the case where only the switch 101 and the diode 103 are broken when no protection switch is provided. The protection switch 210 and the protection switch 211 are arranged, and are disconnected when the devices are broken so that no current flows from the side of the switch 101 to the side of the switch 102. In this state, the circuit is equivalent to a circuit in the case where only the switch 101 is broken when no protection switch is provided (see FIG. 13). In this case, a resonant current from a direct-current power supply 8 to capacitors 401 and 402 on an input side flows in the capacitors 401 and 402, as shown by a pathway A24, and a reactor 703, a capacitor 403, and the capacitor 402, as shown by a pathway B24, and hence an overvoltage resulting from current flow only in the capacitor 402 can be avoided.

When the switch 101 has a short circuit failure but the diode 103 has no failure, the protection switch 210 has no influence. When the diode 103 has a short circuit failure, the protection switch 210 serves as a diode, and hence if the protection switch 210 is immediately turned off, the short circuit of the capacitor 401 is prevented, and the same operation is performed as that in the case where the operation is stopped from a state in which the device is not broken.

As the protection switches 210 and 211, diodes can be used. During the normal operation, the rectification functions of the diodes used as the protection switches are the same in direction as the rectification functions of the diodes 103 and 104 so that no problem occurs. Turning off the protection switches 210 and 211 when the diodes 103 and 104 are broken can be regarded as automatically turning off the protection switches 210 and 211. Therefore, the protection switches 210 and 211 serve as protection switches without connecting MOSFETs or IGBTs in anti-parallel.

Furthermore, as the protection switches, MOSFETs can be used. During the normal operation, gates of these MOSFETs are left on to obtain synchronous rectification if a current flows in the diodes 103 and 104. When the diodes 103 and 104 are broken, the gates of MOSFETs may be turned off. Large loss of the protection switches during circulation, caused when the diodes 103 and 104 are broken, is not a problem, and hence a current may be allowed to circulate through body diodes of the MOSFETs so that the diodes 103 and 104 are replaced by the body diodes of the MOSFETs.

During the normal operation, only one device is added to a pathway in a mode of the pathways shown in FIGS. 6 and 7 according to this embodiment whereas two devices are added to a pathway in the mode of the pathways shown in FIGS. 6 and 7 if bidirectional protection switches 209a and 209c are placed in a connection path 14 as in the second and fourth embodiments. On the other hand, in a mode of the pathway shown in FIG. 9, two devices are added to a pathway. In consideration of the variation ranges of the input voltage and the output voltage and an operation mode, the arrangement of the protection switches can be selected to reduce a device loss. In this case, the behavior is simpler as compared with the case where the bidirectional protection switches placed in the connection path 14 are disconnected.

According to the seventh embodiment, the series order of the diode 103 and the protection switch 210 and the series order of the diode 104 and the protection switch 211 do not matter.

Eighth Embodiment

A three-level chopper apparatus according to an eighth embodiment is now described.

Figure 25:
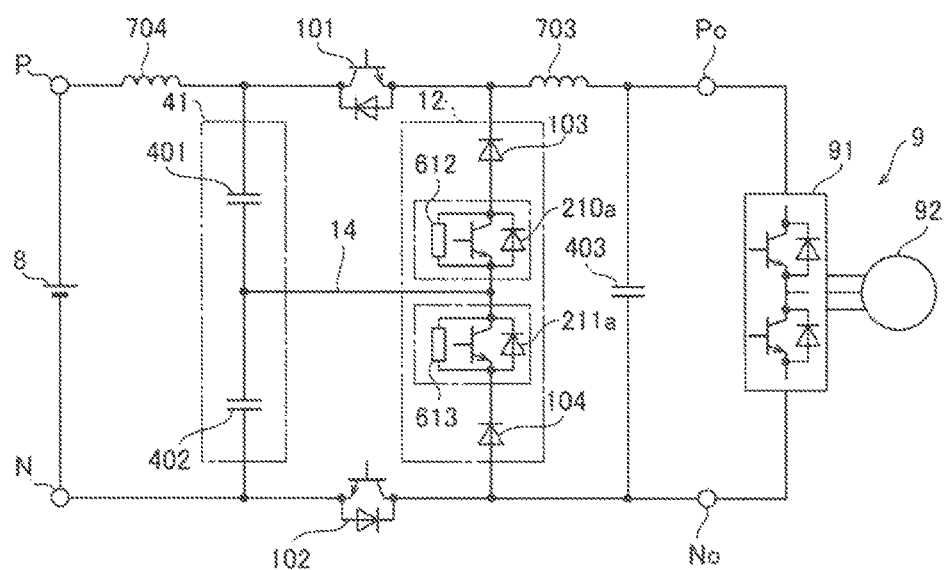
FIG. 25 is a circuit configuration diagram of a three-level chopper apparatus according to an eighth embodiment of the present invention.

According to the eighth embodiment, resistances 612 and 613 are connected in parallel to protection switches 210a and 211a, as shown in FIG. 25. The protection switches 210a and 211a are only required to disconnect a current from the side of a switch 101 to the side of a switch 102, and a current reversely from the side of the switch 102 to the side of the switch 101 may remain capable of circulating. Therefore, as the protection switches 210a and 211a, diodes or MOSFETs can be used, similarly to the seventh embodiment. The protection switch 210a and the resistance 612 are examples of the "twelfth protection switch" and the "fifth resistance" in the claims, respectively. The protection switch 211a and the resistance 613 are examples of the "fifteenth protection switch" and the "sixth resistance" in the claims, respectively.

The protection switches 210a and 211a through which a current can circulate are provided, whereby during the normal operation, on/off of the switches 101 and 102 is switched so that the same current pathways as those in FIGS. 6, 7, 8, and 9 according to the first embodiment can be obtained, and the output voltage can be converted into a direct-current voltage lower than the input voltage. No current flows in the resistances 612 and 613, and the operation of the three-level chopper apparatus is not influenced.

During the normal operation, a current circulates through the protection switches 210 and 211 to flow in diodes 103 and 104, and hence no current flows in the resistances 612 and 613.

Figure 26:
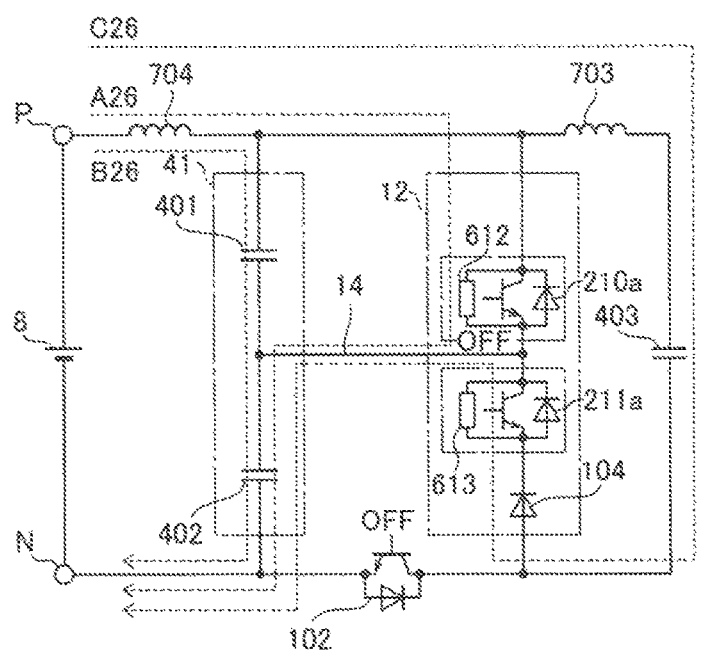
FIG. 26 illustrates an equivalent circuit in the case where a load is separated and an unbroken switch and a protection switch are turned off when one switch and one diode have a short circuit failure in the circuit in FIG. 25.

When the switch 101 and the diode 103 have a short circuit failure, a load 9 is separated and the switch 102 is disconnected to obtain an equivalent circuit in FIG. 26. In this case, a damped oscillation circuit including the resistance 612 in which a current flows, shown by a pathway A26, a resonant circuit including two capacitors 401 and 402, shown by a pathway B26, and a resonant circuit including a reactor 703, a capacitor 403, and the capacitor 402, shown by a pathway C26, are formed. A current flowing in the capacitor 402 is reduced because the resistance 612 is provided, and hence an increase in the voltage is significantly reduced.

According to the eighth embodiment, the series order of the diode 103 and the protection switch 210a and the series order of the diode 104 and the protection switch 211a do not matter.

Ninth Embodiment

A three-level chopper apparatus according to a ninth embodiment is now described.

Figure 27:
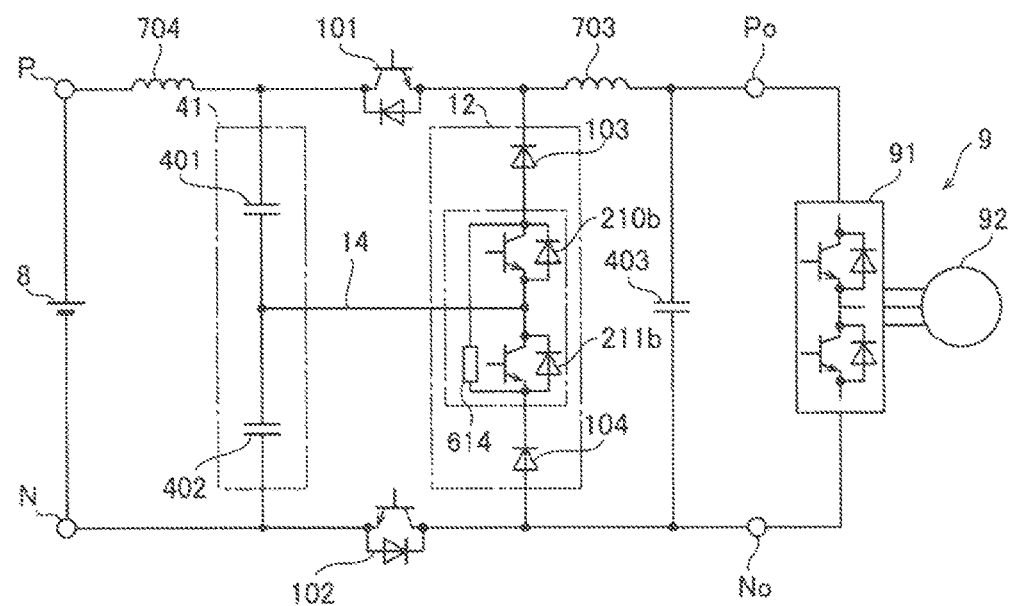
FIG. 27 is a circuit configuration diagram of a three-level chopper apparatus according to a ninth embodiment of the present invention.

According to the ninth embodiment, the three-level chopper apparatus is provided with a protection switch 210b connected in series between a diode 103 and a connection path 14, a protection switch 211b connected in series between a diode 104 and the connection path 14, and a resistance 614 connected in parallel between a connection point between the diode 103 and the protection switch 210b and a connection point between the protection switch 211b and the diode 104, as shown in FIG. 27. The protection switches 210b and 211b are only required to disconnect a current from the side of a switch 101 to the side of a switch 102, and a current reversely from the side of the switch 102 to the side of the switch 101 may remain capable of circulating. Therefore, as the protection switches 210b and 211b, diodes or MOSFETs can be used, similarly to the seventh embodiment. The protection switch 210b and the protection switch 211b are examples of the "first protection switch" and the "second protection switch" in the claims, respectively. The resistance 614 is an example of the "second resistance" in the claims.

During the normal operation, a current circulates through the protection switches 210b and 211b, and hence no current flows in the resistance 614. On/off of the switches 101 and 102 is switched so that the same current pathways as those in FIGS. 6, 7, 8, and 9 according to the first embodiment can be obtained, and the output voltage can be converted into a direct-current voltage lower than the input voltage.

Figure 28:
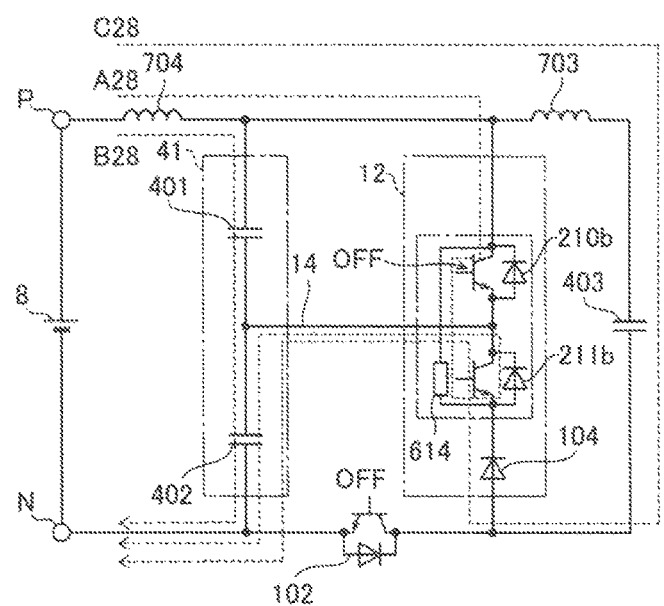
FIG. 28 illustrates an equivalent circuit in the case where a load is separated and an unbroken switch and a protection switch are turned off when one switch and one diode have a short circuit failure in the circuit in FIG. 27.

When the switch 101 and the diode 103 have a short circuit failure, a load 9 is separated and the switch 102 is disconnected to obtain an equivalent circuit in FIG. 28. In this case, a damped oscillation circuit including the resistance 614 in which a current flows, shown by a pathway A28, a resonant circuit including two capacitors 401 and 402, shown by a pathway B28, and a resonant circuit including a reactor 703, a capacitor 403, and the capacitor 402, shown by a pathway C28, are formed. A current flowing in the capacitor 402 is reduced because the resistance 614 is provided, and hence an increase in the voltage is significantly reduced.

Tenth Embodiment

A three-level chopper apparatus according to a tenth embodiment is now described.

Figure 29:
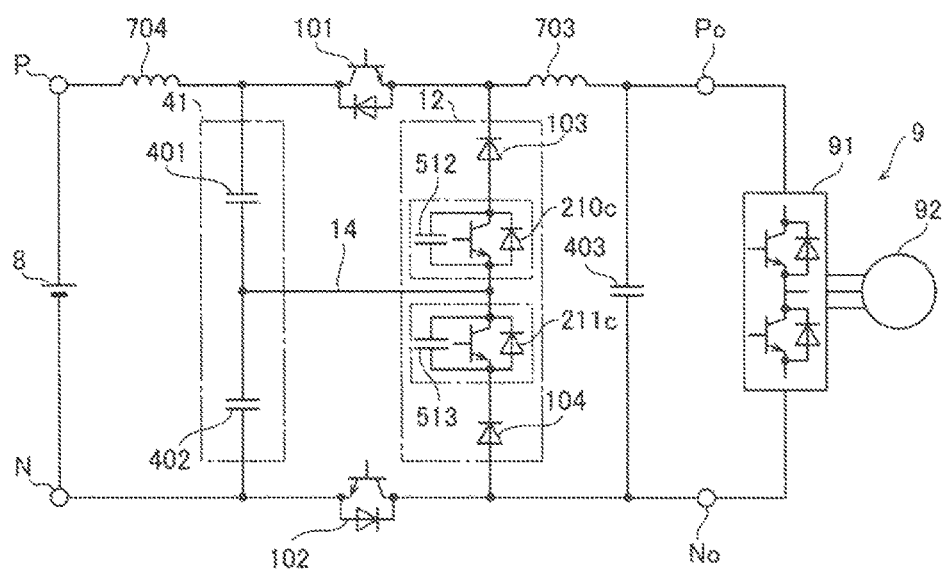
FIG. 29 is a circuit configuration diagram of a three-level chopper apparatus according to a tenth embodiment of the present invention.

According to the tenth embodiment, the three-level chopper apparatus is provided with a protection switch 210c connected in series to a diode 103 and a protection capacitor 512 connected in parallel to the protection switch 210c, as shown in FIG. 29. The three-level chopper apparatus is further provided with a protection switch 211c connected in series to a diode 104 and a protection capacitor 513 connected in parallel to the protection switch 211c. The protection switches 210c and 211c are only required to disconnect a current from the side of a switch 101 to the side of a switch 102, and a current reversely from the side of the switch 102 to the side of the switch 101 may remain capable of circulating.

Therefore, as the protection switches 210c and 211c, diodes or MOSFETs can be used. The protection switch 210c and the protection capacitor 512 are examples of the "thirteenth protection switch" and the "fifth protection capacitor" in the claims, respectively. The protection switch 211c and the protection capacitor 513 are examples of the "sixteenth protection switch" and the "sixth protection capacitor" in the claims, respectively.

The protection switches 210c and 211c through which a current can circulate are provided, whereby during the normal operation, on/off of the switches 101 and 102 is switched so that the same current pathways as those in FIGS. 6, 7, 8, and 9 according to the first embodiment can be obtained, and the output voltage can be converted into a direct-current voltage lower than the input voltage. No current flows in the protection capacitors 512 and 513, and the operation of the three-level chopper apparatus is not influenced.

Figure 30:
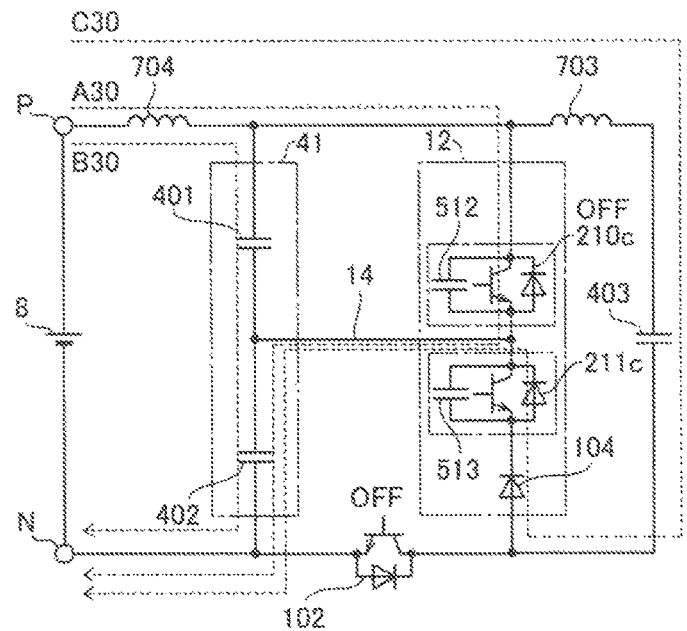
FIG. 30 illustrates an equivalent circuit in the case where a load is separated and an unbroken switch and a protection switch are turned off when one switch and one diode have a short circuit failure in the circuit in FIG. 29.

When the diode 103 and one switch 101 have a short circuit failure, as shown in FIG. 30, a load 9 is separated, and the protection switch 210c is turned off simultaneously with disconnection of the other switch 102. Thus, the protection capacitor 512 is inserted into a charging pathway A30 for a capacitor 402. The voltage of the protection capacitor 512 and the voltage of a capacitor 401 must be equal to each other, and hence a current also flows through a charging pathway B30. The voltages of a reactor 703 and a capacitor 403 are also equal to the voltage of the protection capacitor 512, and hence a current flows through a pathway C30. Although the sum of the voltage of the capacitor 402 and the voltage of the protection capacitor 512 is higher than the voltage of a direct-current power supply 8, the summed voltage is shared, and hence an overvoltage in the capacitor 402 can be prevented.

According to the tenth embodiment, the series order of the diode 103 and the protection switch 210c and the series order of the diode 104 and the protection switch 211c do not matter.

Eleventh Embodiment

A three-level chopper apparatus according to an eleventh embodiment is now described.

Figure 31:
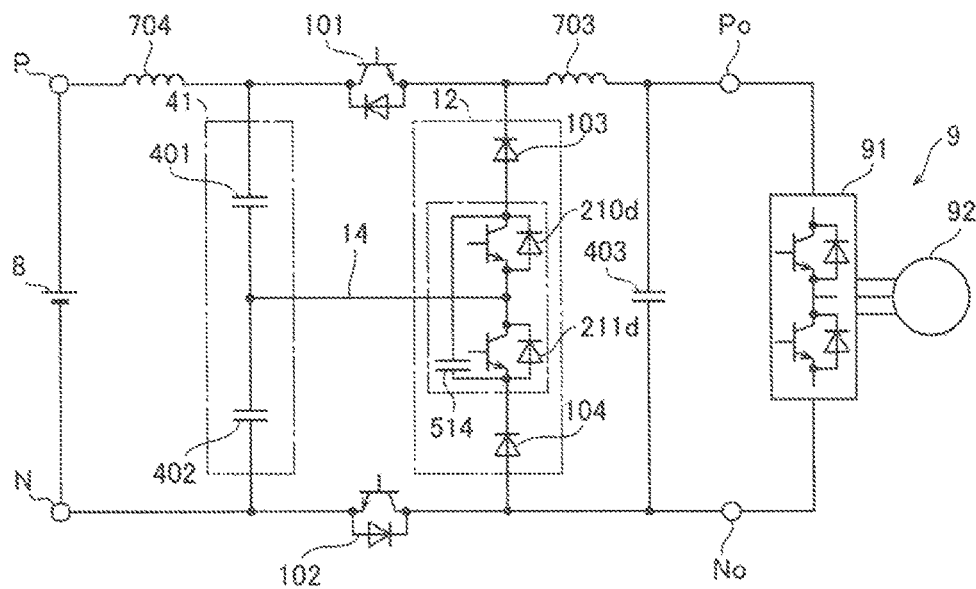
FIG. 31 is a circuit configuration diagram of a three-level chopper apparatus according to an eleventh embodiment of the present invention.

According to the eleventh embodiment, the three-level chopper apparatus is provided with a protection switch 210d connected in series between a diode 103 and a connection path 14, a protection switch 211d connected in series between a diode 104 and the connection path 14, and a protection capacitor 514 connected in parallel between a connection point between the diode 103 and the protection switch 210d and a connection point between the protection switch 211d and the diode 104, as shown in FIG. 31. The protection switches 210d and 211d are only required to disconnect a current from the side of a switch 101 to the side of a switch 102, and a current reversely from the side of the switch 102 to the side of the switch 101 may remain capable of circulating. Therefore, as the protection switches 210d and 211d, diodes or MOSFETs can be used. The protection switch 210d and the protection switch 211d are examples of the "third protection switch" and the "fourth protection switch" in the claims, respectively. The protection capacitor 514 is an example of the "second protection capacitor" in the claims.

The protection switches 210d and 211d through which a current can circulate are provided, whereby during the normal operation, on/off of the switches 101 and 102 is switched so that the same current pathways as those in FIGS. 6, 7, 8, and 9 according to the first embodiment can be obtained, and the output voltage can be converted into a direct-current voltage lower than the input voltage. No current flows in the protection capacitor 514, and the operation of the three-level chopper apparatus is not influenced.

Figure 32:
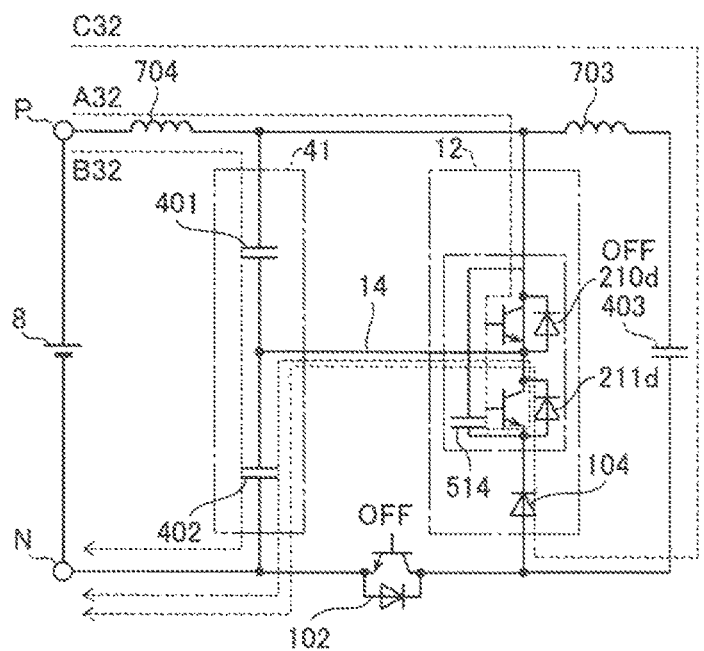
FIG. 32 illustrates an equivalent circuit in the case where a load is separated and an unbroken switch and a protection switch are turned off when one switch and one diode have a short circuit failure in the circuit in FIG. 31.

When the diode 103 and one switch 101 have a short circuit failure, as shown in FIG. 32, a load 9 is separated, and the protection switch 210d is turned off simultaneously with disconnection of the other switch 102. Thus, the protection capacitor 514 is inserted into a charging pathway A32 for a capacitor 402, passing through the devices having a short circuit failure. The voltage of the protection capacitor 514 and the voltage of a capacitor 401 must be equal to each other, and hence a current also flows through a charging pathway B32. The voltages of a reactor 703 and a capacitor 403 are also equal to the voltage of the protection capacitor 514, and hence a current flows through a pathway C32. Although the sum of the voltage of the capacitor 402 and the voltage of the protection capacitor 514 is higher than the voltage of a direct-current power supply 8, the summed voltage is shared, and hence an overvoltage in the capacitor 402 can be prevented.

Twelfth Embodiment

A three-level chopper apparatus according to a twelfth embodiment is now described.

Figure 33:
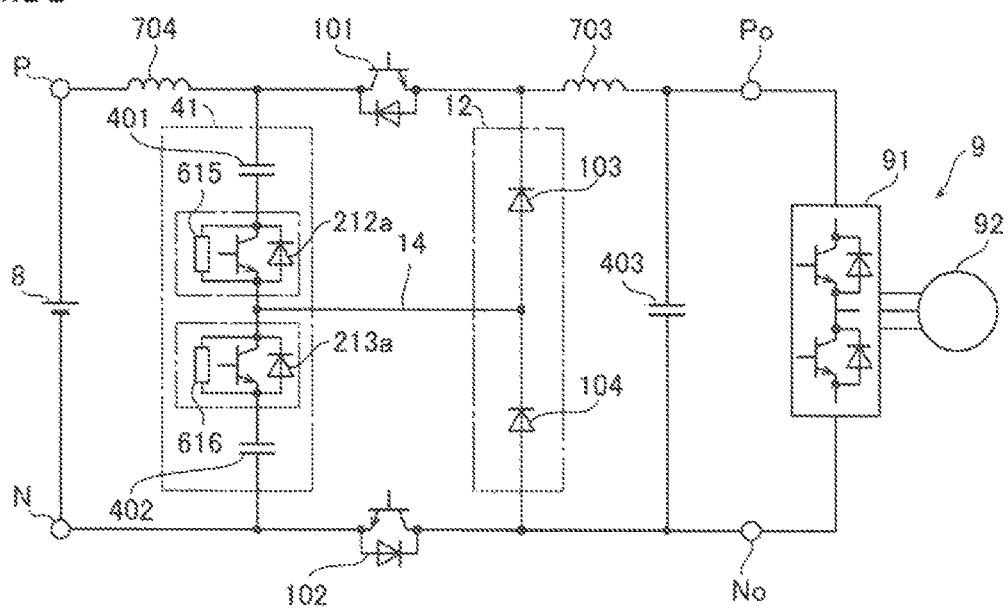
FIG. 33 is a circuit configuration diagram of a three-level chopper apparatus according to a twelfth embodiment of the present invention.

According to the twelfth embodiment, the three-level chopper apparatus is provided with a protection switch 212a connected in series to a capacitor 401 and a resistance 615 connected in parallel to the protection switch 212a, as shown in FIG. 33. The three-level chopper apparatus is further provided with a protection switch 213a connected in series to a capacitor 402 and a resistance 616 connected in parallel to the protection switch 213a. The protection switch 212a and the resistance 615 are examples of the "fifteenth protection switch" and the "sixth resistance" in the claims, respectively. The protection switch 213a and the resistance 616 are examples of the "twelfth protection switch" and the "fifth resistance" in the claims, respectively.

During the normal operation, the protection switches 212a and 213a are in an on-state, and both ends of the resistances 615 and 616 short-circuit. On/off of switches 101 and 102 is switched so that the same current pathways as those in FIGS. 6, 7, 8, and 9 according to the first embodiment can be obtained, and the output voltage can be converted into a direct-current voltage lower than the input voltage.

Figure 34:
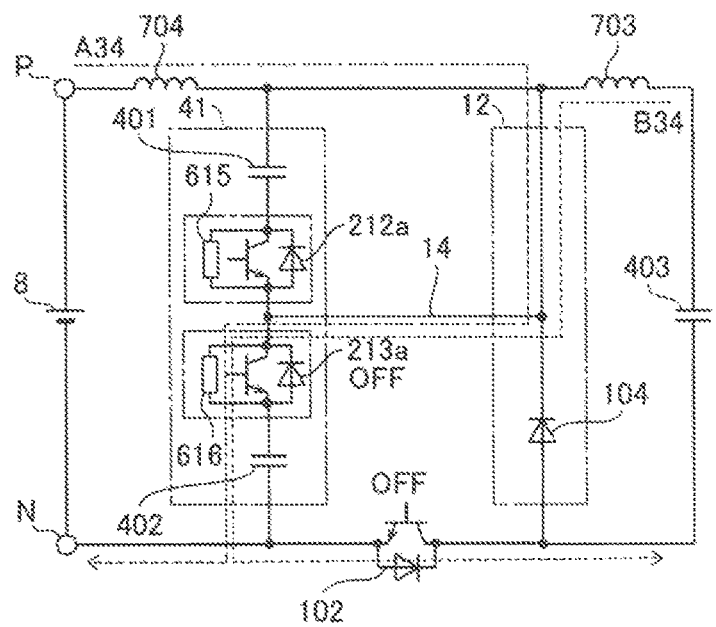
FIG. 34 illustrates an equivalent circuit in the case where a load is separated and an unbroken switch and a protection switch are turned off when one switch and one diode have a short circuit failure in the circuit in FIG. 33.

When a diode 103 and one switch 101 have a short circuit failure, as shown in FIG. 34, a load 9 is separated, and the protection switch 213a is turned off simultaneously with disconnection of the other switch 102. Thus, the resistance 616 is inserted into a charging pathway A34 for the capacitor 402. This pathway is an LCR resonant circuit, and hence occurring oscillation is damped oscillation. Thus, the attained voltage of the capacitor 402 becomes lower than that when there is no protection circuit. Furthermore, conditions for critical damping and overdamping are met, and the attained voltage of the capacitor 402 is held to the voltage of a direct-current power supply 8 when the resistance value Ra of the resistance 616 satisfies the following formula (4), letting Ra be the resistance value of the resistance 616, L be the inductance of a reactor 704, and C2 be the capacity of the capacitor 402.

$$Ra \geq 2 \times (2 \times L/C2)^{1/2} \quad (4)$$

During charging of the capacitor 402 with a current from the direct-current power supply 8, a resonant current with a reactor 703 circulates through the switch 102 to flow from a capacitor 403 to the capacitor 402 if the voltage of the capacitor 403 is higher than the voltage of the capacitor 402. When the current in this pathway B34 reaches zero, no current flows from the capacitor 402 to the capacitor 403 because of the switch 102 in an off-state. When the current in the pathway B34 reaches zero before a current in the pathway A34, the capacitor 402 is thereafter charged only through the charging pathway A34. Thus, when a condition for the formula (4) is satisfied, the voltage of the capacitor 402 is held to the voltage of the direct-current power supply 8.

When the resistance 616 is not connected to the protection switch 213a, the pathway A34 is disconnected to intend to interrupt a current in the reactor 704. Thus, surge breakdown is caused. Therefore, parallel connection of the resistance 616 is required. Slow interruption performed not to cause surge breakdown leads to termination of charging of the capacitor 402, and hence an overvoltage cannot be prevented. Furthermore, thermal breakdown may be caused by an increase in a turn-off power loss.

The protection switches 213a and 212a through which a current can circulate are required so that the capacitors 401 and 402 are charged and discharged also during the normal operation. When a freewheeling diode is used, no reverse recovery occurs during the normal operation, and hence a low loss is achieved if a Si-pn diode is used. If a SiC-SB diode is used, the forward recovery voltage can be reduced, and the noise can be reduced. If the SiC-SB diode and the Si-pn diode are placed in parallel, the forward recovery voltage and the on-voltage can be reduced. That is to say a low noise and a low loss can be achieved. If the protection switch 212a is a bidirectional switch, and is turned off when the diode 103 and the switch 101 have a short circuit failure, an effect that the resistance 615 prevents the short circuit of the capacitor 401 can be obtained. In this case, the protection switch 212a is required to be immediately turned off.

When a diode 104 and the switch 102 have a short circuit failure, an overvoltage in the capacitor 401 can be prevented by turning off the protection switch 212a. Similarly to the protection switch 213a, the conditions for critical damping and overdamping are met. The attained voltage of the capacitor 401 is held to the voltage of the direct-current power supply 8 when the resistance value Rb of the resistance 615 satisfies the following formula (5), letting Rb be the resistance value of the resistance 615, L be the inductance of the reactor 704, and C1 be the capacity of the capacitor 401.

$$Rb \geq 2\times(2\times L/C1)^{1/2} \quad (5)$$

According to the twelfth embodiment, the series order of the capacitor 401 and the protection switch 212a and the series order of the capacitor 402 and the protection switch 213a do not matter.

Thirteenth Embodiment

A three-level chopper apparatus according to a thirteenth embodiment is now described.

Figure 35:
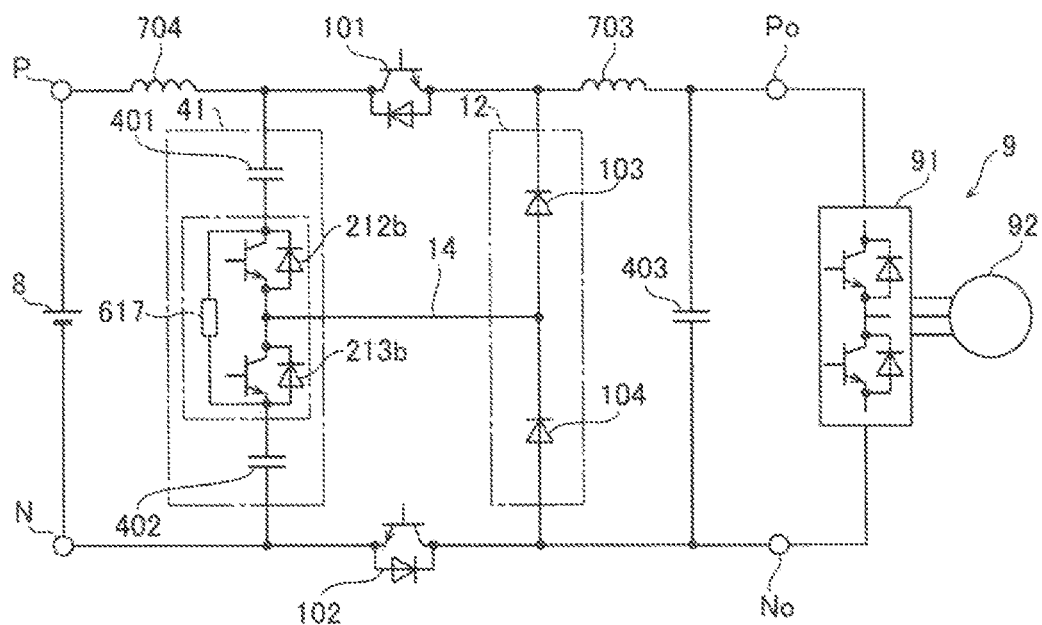
FIG. 35 is a circuit configuration diagram of a three-level chopper apparatus according to a thirteenth embodiment of the present invention.

According to the thirteenth embodiment, the three-level chopper apparatus is provided with a protection switch 212b connected in series between a capacitor 401 and a connection path 14, a protection switch 213b connected in series between a capacitor 402 and the connection path 14, and a resistance 617 connected in parallel between a connection point between the capacitor 401 and the protection switch 212b and a connection point between the protection switch 213b and the capacitor 402, as shown in FIG. 35. The protection switch 212b and the protection switch 213b are examples of the "fifth protection switch" and the "sixth protection switch" in the claims, respectively. The resistance 617 is an example of the "third resistance" in the claims.

During the normal operation, the protection switches 212b and 213b are in an on-state, and both ends of the resistance 617 short-circuit. On/off of switches 101 and 102 is switched so that the same current pathways as those in FIGS. 6, 7, 8, and 9 according to the first embodiment can be obtained, and the output voltage can be converted into a direct-current voltage lower than the input voltage.

Figure 36:
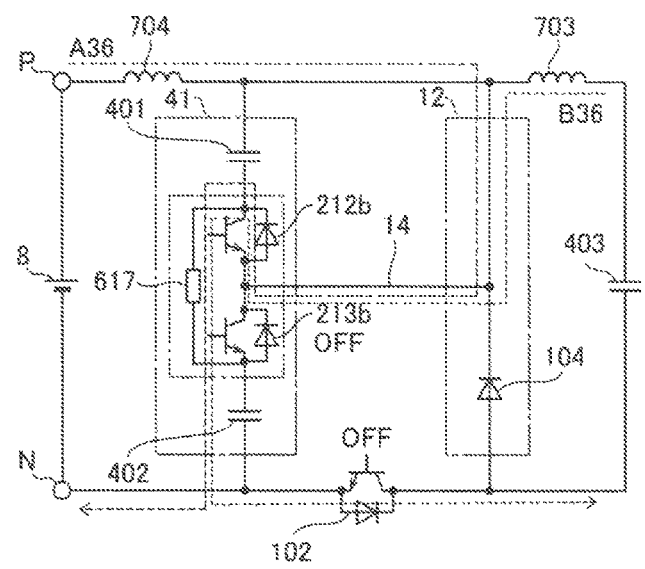
FIG. 36 illustrates an equivalent circuit in the case where a load is separated and an unbroken switch and a protection switch are turned off when one switch and one diode have a short circuit failure in the circuit in FIG. 35.

When a diode 103 and one switch 101 have a short circuit failure, as shown in FIG. 36, a load 9 is separated, and the protection switch 213b is turned off simultaneously with disconnection of the other switch 102. Thus, the resistance 617 is inserted into a charging pathway A36 for the capacitor 402. This pathway is an LCR resonant circuit, and hence occurring oscillation is damped oscillation. Thus, the attained voltage of the capacitor 402 becomes lower than that when there is no protection circuit. Furthermore, conditions for critical damping and overdamping are met, and the attained voltage of the capacitor 402 is held to the voltage of a direct-current power supply 8 when a resistance value R satisfies the following formula (6), letting R be the resistance value of the resistance 617, L be the inductance of a reactor 704, and C2 be the capacity of the capacitor 402.

$$R \geq 2\times(2\times L/C2)^{1/2} \quad (6)$$

During charging of the capacitor 402 with a current from the direct-current power supply 8, a damped oscillation current with a reactor 703 and the resistance 617 circulates through the switch 102 to flow from a capacitor 403 to the capacitor 402 in a pathway B36 if the voltage of the capacitor 403 is increased by resonance with the reactor 703 and is higher than the voltage of the capacitor 402. When the current in this pathway B36 reaches zero, no current flows from the capacitor 402 to the capacitor 403 because of the switch 102 in an off-state. When the current in the pathway B36 reaches zero before a current in the pathway A36, the capacitor 402 is thereafter charged only through the charging pathway A36. Thus, when a condition for the formula (6) is satisfied, the voltage of the capacitor 402 is held to the voltage of the direct-current power supply 8.

Also when a diode 104 and the switch 102 have a short circuit failure, an overvoltage in the capacitor 401 can be prevented by turning off the protection switch 212b. Also in this case, the conditions for critical damping and overdamping are met. Therefore, the attained voltage of the capacitor 401 or 402 is held to the voltage of the direct-current power supply 8, in both cases where the diode 103 and the switch 101 have a short circuit failure and where the diode 104 and the switch 102 have a short circuit failure, when the resistance value R of the resistance 617 satisfies the following formula (7), letting C be the smaller of the capacity of the capacitor 401 and the capacity of the capacitor 402.

$$R \geq 2\times(2\times L/C)^{1/2} \quad (7)$$

The protection switches 213b and 212b through which a current can circulate are required so that the capacitors 401 and 402 are charged and discharged also during the normal operation, and a charging pathway for the capacitor serves as a pathway in which a current circulates through the protection switch during the protection operation. When a freewheeling diode is used, no reverse recovery occurs during the normal operation, and hence a low loss is achieved if a Si-pn diode is used. If a SiC-SB diode is used, the forward recovery voltage can be reduced, and the noise can be reduced. If the SiC-SB diode and the Si-pn diode are placed in parallel, the forward recovery voltage and the on-voltage can be reduced. That is to say a low noise and a low loss can be achieved. If the protection switch 212b is a bidirectional switch, and is turned off when the diode 103 and the switch 101 have a short circuit failure, the pathway A36 is shut off. Thus, surge breakdown is inappropriately caused by intending to interrupt the current in the reactor 704.

Fourteenth Embodiment

A three-level chopper apparatus according to a fourteenth embodiment is now described.

Figure 37:
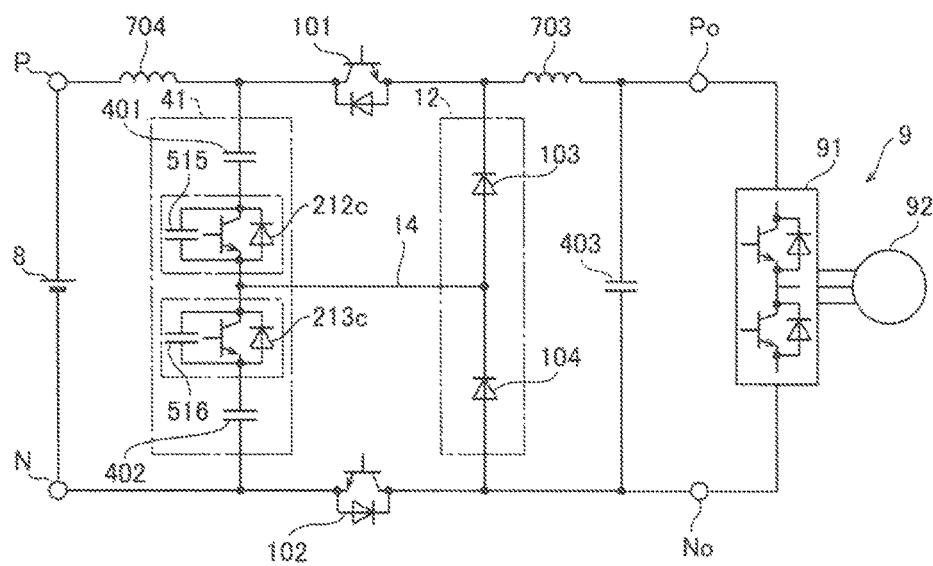
FIG. 37 is a circuit configuration diagram of a three-level chopper apparatus according to a fourteenth embodiment of the present invention.

According to the fourteenth embodiment, the three-level chopper apparatus is provided with a protection switch 212c connected in series to a capacitor 401 and a protection capacitor 515 connected in parallel to the protection switch 212c, as shown in FIG. 37. The three-level chopper apparatus is further provided with a protection switch 213c connected in series to a capacitor 402 and a protection capacitor 516 connected in parallel to the protection switch 213c. The protection switch 212c and the protection capacitor 515 are examples of the "sixteenth protection switch" and the "sixth protection capacitor" in the claims, respectively. The protection switch 213c and the protection capacitor 516 are examples of the "thirteenth protection switch" and the "fifth protection capacitor" in the claims, respectively.

During the normal operation, the protection switches 212c and 213c are in an on-state, and both ends of the protection capacitors 515 and 516 short-circuit. On/off of switches 101 and 102 is switched so that the same current pathways as those in FIGS. 6, 7, 8, and 9 according to the first embodiment can be obtained, and the output voltage can be converted into a direct-current voltage lower than the input voltage.

Figure 38:
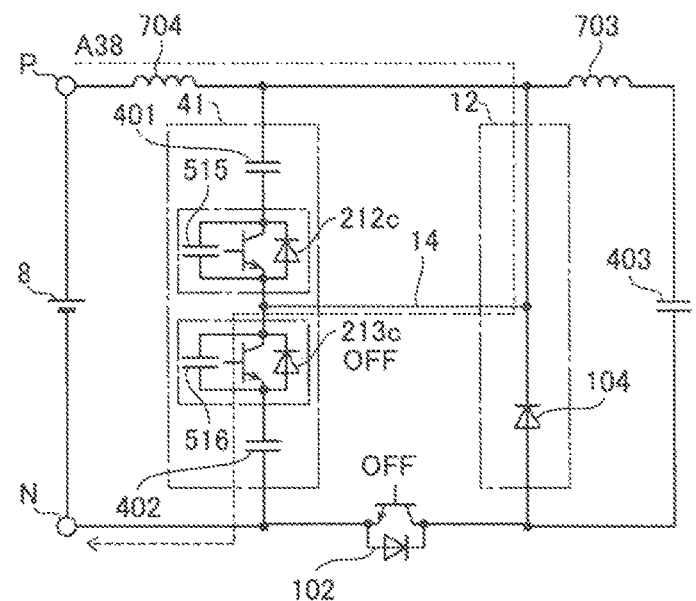
FIG. 38 illustrates an equivalent circuit in the case where a load is separated and an unbroken switch and a protection switch are turned off when one switch and one diode have a short circuit failure in the circuit in FIG. 37.

When a diode 103 and one switch 101 have a short circuit failure, as shown in FIG. 38, a load 9 is separated, and the protection switch 213c is turned off simultaneously with disconnection of the other switch 102. Thus, the protection capacitor 516 is inserted into a charging pathway A38 for the capacitor 402. Although the sum of the voltage of the capacitor 402 and the voltage of the protection capacitor 516 is higher than the voltage of a direct-current power supply 8, the summed voltage is shared, and hence an overvoltage in the capacitor 402 can be prevented.

When the protection capacitor 516 is not connected to the protection switch 213c, the pathway A38 is disconnected to intend to interrupt a current in a reactor 704. Thus, surge breakdown is caused. Therefore, parallel connection of the protection capacitor 516 is required. Slow interruption performed not to cause surge breakdown leads to termination of charging of the capacitor 402, and hence an overvoltage cannot be prevented. Furthermore, thermal breakdown may be caused by an increase in a turn-off power loss.

The protection switches 213c and 212c through which a current can circulate are required so that the capacitors 401 and 402 are charged and discharged also during the normal operation. When a freewheeling diode is used, no reverse recovery occurs during the normal operation, and hence a low loss is achieved if a Si-pn diode is used. If a SiC-SB diode is used, the forward recovery voltage can be reduced, and the noise can be reduced. If the SiC-SB diode and the Si-pn diode are placed in parallel, the forward recovery voltage and the on-voltage can be reduced. That is to say a low noise and a low loss can be achieved.

According to the fourteenth embodiment, the series order of the capacitor 401 and the protection switch 212c and the series order of the capacitor 402 and the protection switch 213c do not matter.

Fifteenth Embodiment

A three-level chopper apparatus according to a fifteenth embodiment is now described.

Figure 39:
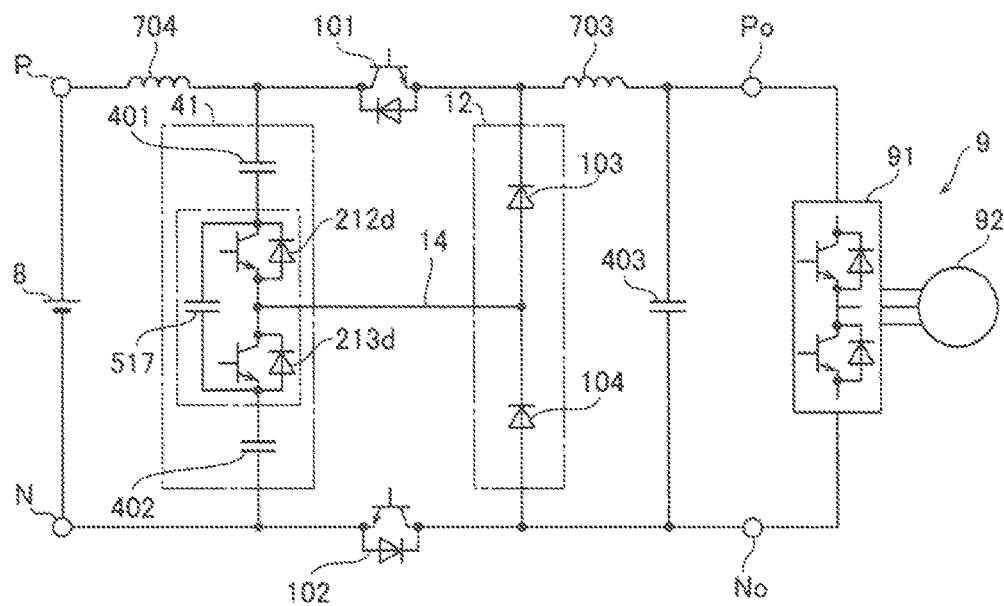
FIG. 39 is a circuit configuration diagram of a three-level chopper apparatus according to a fifteenth embodiment of the present invention.

According to the fifteenth embodiment, the three-level chopper apparatus is provided with a protection switch 212d connected in series between a capacitor 401 and a connection path 14, a protection switch 213d connected in series between a capacitor 402 and the connection path 14, and a protection capacitor 517 connected in parallel between a connection point between the capacitor 401 and the protection switch 212d and a connection point between the protection switch 213d and the capacitor 402, as shown in FIG. 39. The protection switch 212d and the protection switch 213d are examples of the "seventh protection switch" and the "eighth protection switch" in the claims, respectively. The protection capacitor 517 is an example of the "third protection capacitor" in the claims.

During the normal operation, the protection switches 212d and 213d are in an on-state, and both ends of the protection capacitor 517 short-circuit. On/off of switches 101 and 102 is switched so that the same current pathways as those in FIGS. 6, 7, 8, and 9 according to the first embodiment can be obtained, and the output voltage can be converted into a direct-current voltage lower than the input voltage.

Figure 40:
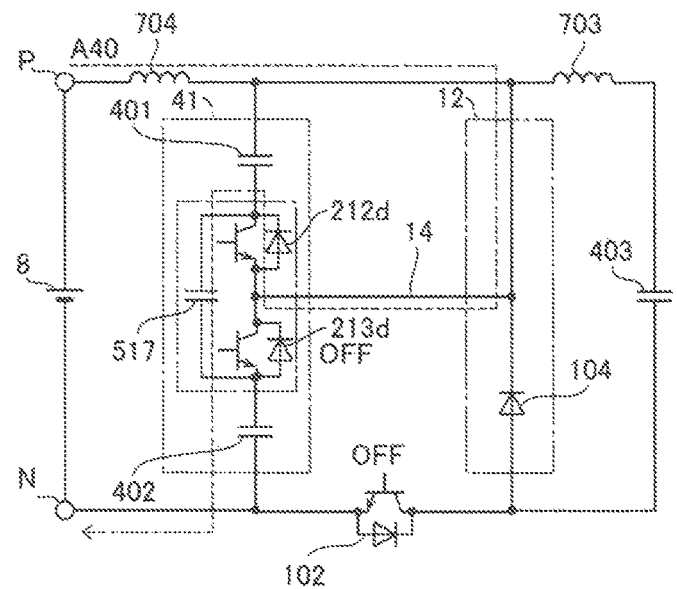
FIG. 40 illustrates an equivalent circuit in the case where a load is separated and an unbroken switch and a protection switch are turned off when one switch and one diode have a short circuit failure in the circuit in FIG. 39.

When a diode 103 and one switch 101 have a short circuit failure, as shown in FIG. 40, a load 9 is separated, and the protection switch 213d is turned off simultaneously with disconnection of the other switch 102. Thus, the protection capacitor 517 is inserted into a charging pathway A40 for the capacitor 402. Although the sum of the voltage of the capacitor 402 and the voltage of the protection capacitor 517 is higher than the voltage of a direct-current power supply 8, the summed voltage is shared, and hence an overvoltage in the capacitor 402 can be prevented.

The protection switches 213d and 212d through which a current can circulate are required so that the capacitors 401 and 402 are charged and discharged also during the normal operation, and a charging pathway for the capacitor serves as a pathway in which a current circulates through the protection switch during the protection operation. When a freewheeling diode is used, no reverse recovery occurs during the normal operation, and hence a low loss is achieved if a Si-pn diode is used. If a SiC-SB diode is used, the forward recovery voltage can be reduced, and the noise can be reduced. If the SiC-SB diode and the Si-pn diode are placed in parallel, the forward recovery voltage and the on-voltage can be reduced. That is to say a low noise and a low loss can be achieved.

Sixteenth Embodiment

A three-level chopper apparatus according to a sixteenth embodiment is now described.

Figure 41:
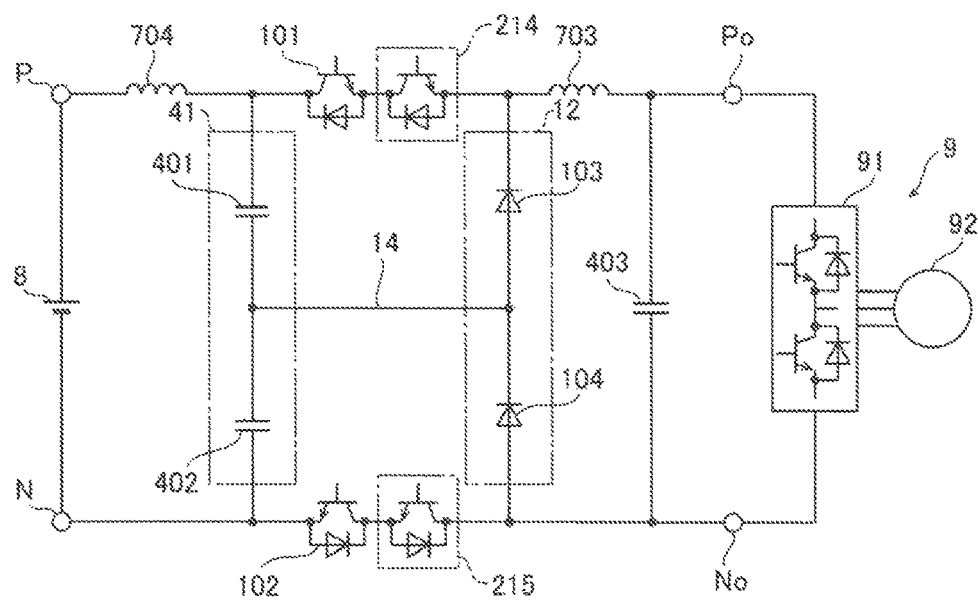
FIG. 41 is a circuit configuration diagram of a three-level chopper apparatus according to a sixteenth embodiment of the present invention.

According to the sixteenth embodiment, the three-level chopper apparatus is provided with a protection switch 214 connected in series to a switch 101 and a protection switch 215 connected in series to a switch 102, as shown in FIG. 41. The protection switch 214 and the protection switch 215 are examples of the "eleventh protection switch" and the "fourteenth protection switch" in the claims, respectively.

During the normal operation, the protection switches 214 and 215 are in an on-state, and on/off of the switches 101 and 102 is switched so that the same current pathways as those in FIGS. 6, 7, 8, and 9 according to the first embodiment can be obtained. Furthermore, the output voltage can be converted into a direct-current voltage lower than the input voltage.

Figure 42:
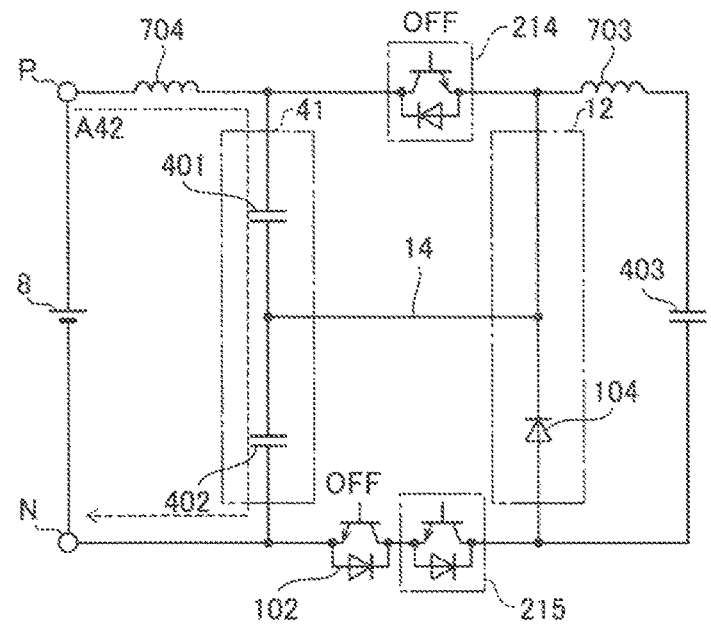
FIG. 42 illustrates an equivalent circuit in the case where a load is separated and an unbroken switch and a protection switch are turned off when one switch and one diode have a short circuit failure in the circuit in FIG. 41.

When a diode 103 and one switch 101 have a short circuit failure, as shown in FIG. 42, a load 9 is separated, and the protection switch 214 is turned off simultaneously with disconnection of the other switch 102. Thus, a charging pathway for a capacitor 402 is a pathway A42 passing through a capacitor 401. Although the sum of the voltage of the capacitor 402 and the voltage of the capacitor 401 is higher than the voltage of a direct-current power supply 8, the summed voltage is shared, and hence an overvoltage in the capacitor 402 can be prevented. If the protection switch 214 is blocked immediately after the short circuit failure, an effect of preventing the discharging of the capacitor 401 can be obtained.

When the devices have a short circuit failure, a current may flow back from a capacitor 403 to the capacitors 401 and 402 so that a reverse bias may be applied to the protection switches 214 and 215. Thus, the protection switches 214 and 215 having reverse blocking capability or through which a current can circulate are required. When a freewheeling diode is used, the same does not conduct during the normal operation, and hence a Si-pn diode, which is inexpensive, may be used.

According to the sixteenth embodiment, the series order of the switch 101 and the protection switch 214 and the series order of the switch 102 and the protection switch 215 do not matter.

Seventeenth Embodiment

A three-level chopper apparatus according to a seventeenth embodiment is now described.

Figure 43:
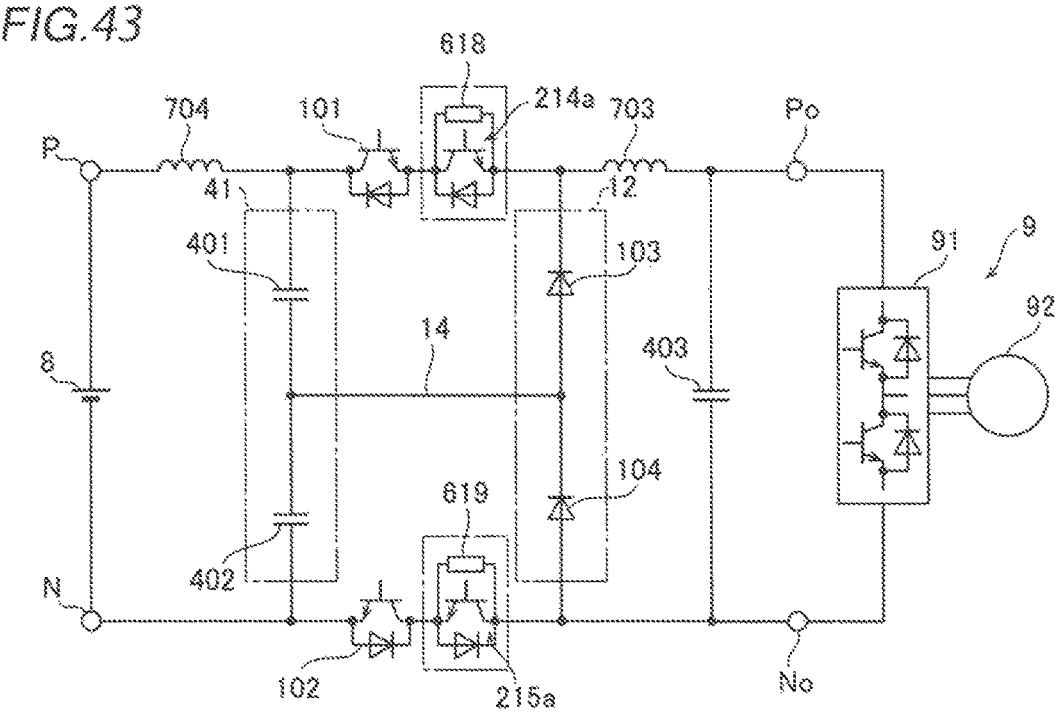
FIG. 43 is a circuit configuration diagram of a three-level chopper apparatus according to a seventeenth embodiment of the present invention.

According to the seventeenth embodiment, the three-level chopper apparatus is provided with a protection switch 214a connected in series to a switch 101 and a resistance 618 connected in parallel to the protection switch 214a, as shown in FIG. 43. The three-level chopper apparatus is further provided with a protection switch 215a connected in series to a switch 102 and a resistance 619 connected in parallel to the protection switch 215a. The protection switch 214a and the resistance 618 are examples of the "twelfth protection switch" and the "fifth resistance" in the claims, respectively. The protection switch 215a and the resistance 619 are examples of the "fifteenth protection switch" and the "sixth resistance" in the claims, respectively.

During the normal operation, the protection switches 214a and 215a are in an on-state, and both ends of the resistances 618 and 619 short-circuit. On/off of the switches 101 and 102 is switched so that the same current pathways as those in FIGS. 6, 7, 8, and 9 according to the first embodiment can be obtained, and the output voltage can be converted into a direct-current voltage lower than the input voltage.

Figure 44:
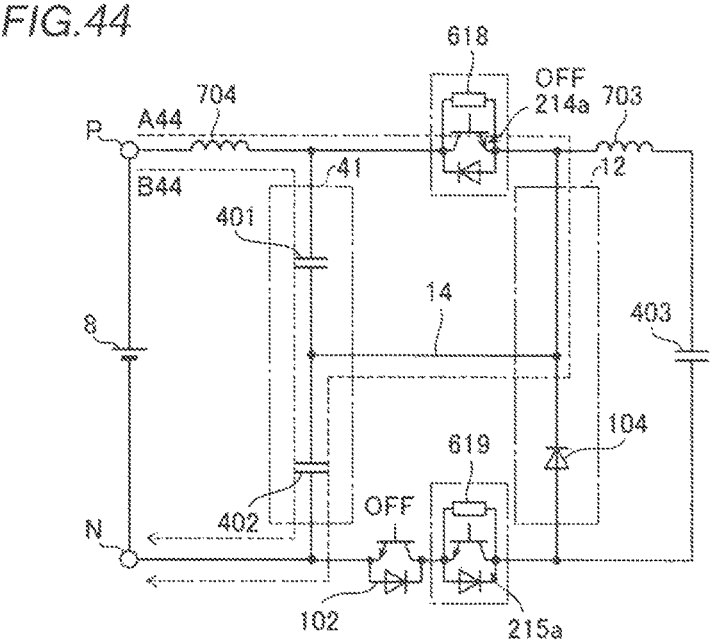
FIG. 44 illustrates an equivalent circuit in the case where a load is separated and an unbroken switch and a protection switch are turned off when one switch and one diode have a short circuit failure in the circuit in FIG. 43.

When a diode 103 and one switch 101 have a short circuit failure, as shown in FIG. 44, a load 9 is separated, and the protection switch 214a is turned off simultaneously with disconnection of the other switch 102. Thus, the resistance 618 is inserted into a charging pathway A44 for a capacitor 402. The voltage of the resistance 618 and the voltage of a capacitor 401 must be equal to each other, and hence a current also flows through a charging pathway B44. The voltage of the capacitor 402 becomes lower than that when there is no protection circuit. If the protection switch 214a is blocked immediately after the short circuit failure, an effect of preventing the short circuit of the capacitor 401 due to the resistance 618 can be obtained.

When the devices have a short circuit failure, a current may flow back from a capacitor 403 to the capacitors 401 and 402 so that a reverse bias may be applied to the protection switches 214a and 215a. Thus, the protection switches 214a and 215a having reverse blocking capability or through which a current can circulate are required. When a freewheeling diode is used, the same does not conduct during the normal operation, and hence a Si-pn diode, which is inexpensive, may be used.

According to the seventeenth embodiment, the series order of the switch 101 and the protection switch 214a and the series order of the switch 102 and the protection switch 215a do not matter.

Eighteenth Embodiment

A three-level chopper apparatus according to an eighteenth embodiment is now described.

Figure 45:
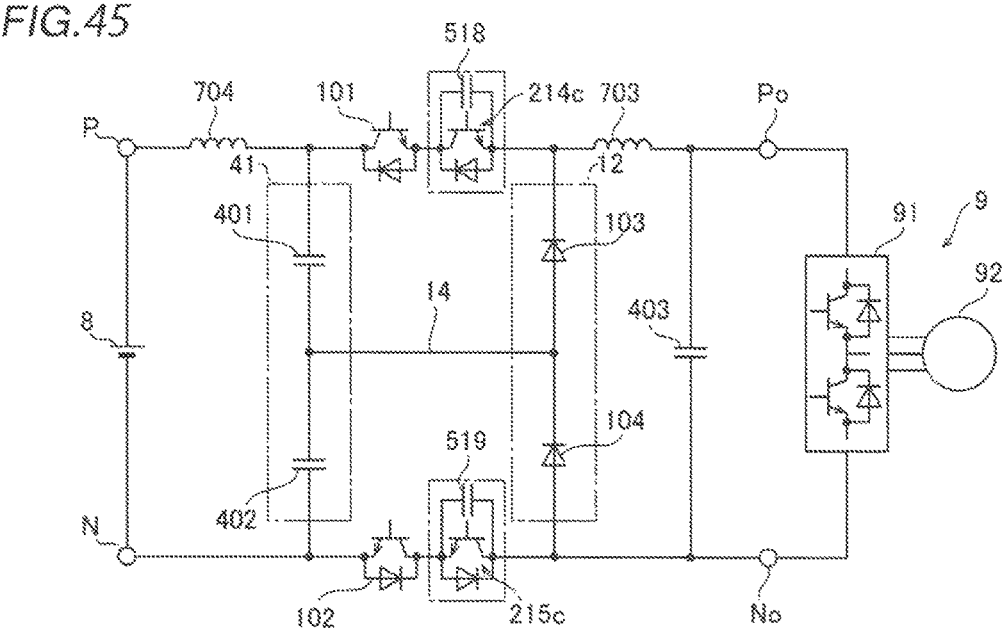
FIG. 45 is a circuit configuration diagram of a three-level chopper apparatus according to an eighteenth embodiment of the present invention.

According to the eighteenth embodiment, the three-level chopper apparatus is provided with a protection switch 214c connected in series to a switch 101 and a protection capacitor 518 connected in parallel to the protection switch 214c, as shown in FIG. 45. The three-level chopper apparatus is further provided with a protection switch 215c connected in series to a switch 102 and a protection capacitor 519 connected in parallel to the protection switch 215c. The protection switch 214c and the protection capacitor 518 are examples of the "thirteenth protection switch" and the "fifth protection capacitor" in the claims, respectively. The protection switch 215c and the protection capacitor 519 are examples of the "sixteenth protection switch" and the "sixth protection capacitor" in the claims, respectively.

During the normal operation, the protection switches 214c and 215c are in an on-state, and both ends of the protection capacitors 518 and 519 short-circuit. On/off of the switches 101 and 102 is switched so that the same current pathways as those in FIGS. 6, 7, 8, and 9 according to the first embodiment can be obtained, and the output voltage can be converted into a direct-current voltage lower than the input voltage.

Figure 46:
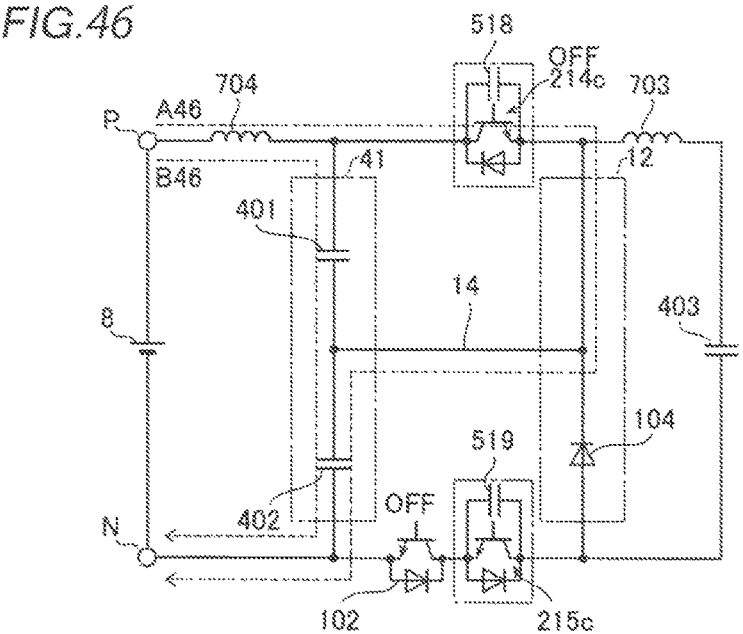
FIG. 46 illustrates an equivalent circuit in the case where a load is separated and an unbroken switch and a protection switch are turned off when one switch and one diode have a short circuit failure in the circuit in FIG. 45.

When a diode 103 and one switch 101 have a short circuit failure, as shown in FIG. 46, a load 9 is separated, and the protection switch 214c is turned off simultaneously with disconnection of the other switch 102. Thus, the protection capacitor 518 is inserted into a charging pathway A46 for a capacitor 402. The voltage of the protection capacitor 518 and the voltage of a capacitor 401 must be equal to each other, and hence a current also flows through a charging pathway B46. Although the sum of the voltage of the capacitor 402 and the voltage of the protection capacitor 518 is higher than the voltage of a direct-current power supply 8, the summed voltage is shared, and hence an overvoltage in the capacitor 402 can be prevented.

When the devices have a short circuit failure, a current may flow back from a capacitor 403 to the capacitors 401 and 402 so that a reverse bias may be applied to the protection switches 214c and 215c. Thus, the protection switches 214c and 215c having reverse blocking capability or through which a current can circulate are required. When a freewheeling diode is used, the same does not conduct during the normal operation, and hence a Si-pn diode, which is inexpensive, may be used.

According to the eighteenth embodiment, the series order of the switch 101 and the protection switch 214c and the series order of the switch 102 and the protection switch 215c do not matter.

Nineteenth Embodiment

A three-level chopper apparatus according to a nineteenth embodiment is now described.

Figure 47:
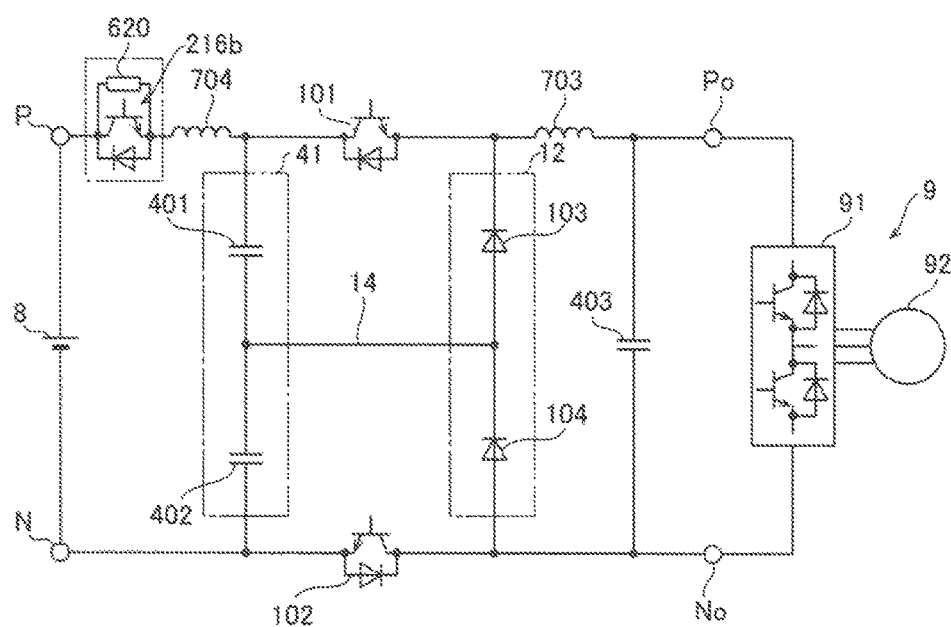
FIG. 47 is a circuit configuration diagram of a three-level chopper apparatus according to a nineteenth embodiment of the present invention.

According to the nineteenth embodiment, the three-level chopper apparatus is provided with a protection switch 216b connected in series to a reactor 704 and a resistance 620 connected in parallel to both ends of the protection switch 216b, as shown in FIG. 47. The protection switch 216b and the resistance 620 are examples of the "ninth protection switch" and the "fourth resistance" in the claims, respectively.

During the normal operation, the protection switch 216b is in an on-state, and both ends of the resistance 620 short-circuit. On/off of switches 101 and 102 is switched so that the same current pathways as those in FIGS. 6, 7, 8, and 9 according to the first embodiment can be obtained, and the output voltage can be converted into a direct-current voltage lower than the input voltage.

Figure 48:
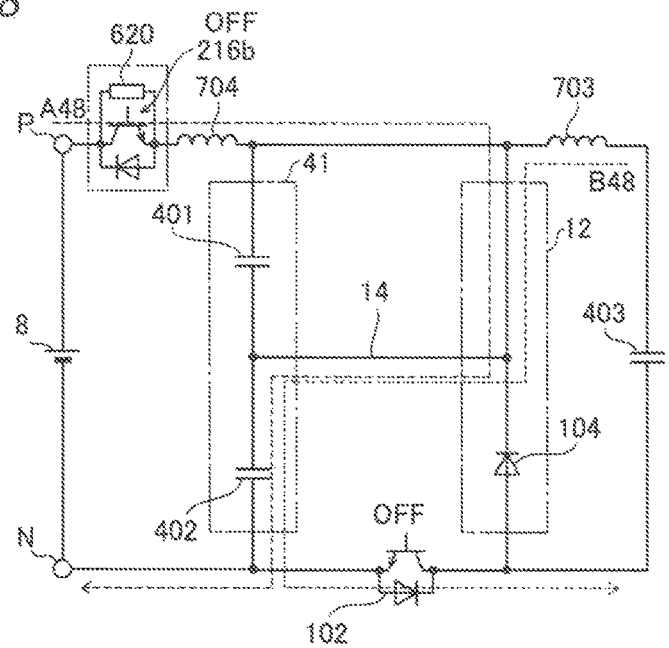
FIG. 48 illustrates an equivalent circuit in the case where a load is separated and an unbroken switch and a protection switch are turned off when one switch and one diode have a short circuit failure in the circuit in FIG. 47.

When a diode 103 and one switch 101 have a short circuit failure, as shown in FIG. 48, the protection switch 216b is turned off so that the resistance 620 is inserted into a charging pathway A48 for a capacitor 402. This pathway is an LCR resonant circuit, and hence occurring oscillation is damped oscillation. Thus, the attained voltage of the capacitor 402 becomes lower than that when there is no protection circuit. Furthermore, conditions for critical damping and overdamping are met, and the attained voltage of the capacitor 402 is held to the voltage of a direct-current power supply 8 when a resistance value R satisfies the following formula (8), letting R be the resistance value of the resistance 620, L be the inductance of the reactor 704, and C2 be the capacity of the capacitor 402.

$$R \geq 2 \times (2 \times L/C2)^{1/2} \quad (8)$$

During charging of the capacitor 402 with a current from the direct-current power supply 8, a resonant current with a reactor 703 circulates through the switch 102 to flow from a capacitor 403 to the capacitor 402 in a pathway B48 if the voltage of the capacitor 403 is higher than the voltage of the capacitor 402. When the current in this pathway B48 reaches zero, no current flows from the capacitor 402 to the capacitor 403 because of the switch 102 in an off-state. When the current in the pathway B48 reaches zero before a current in the pathway A48, the capacitor 402 is thereafter charged only through the charging pathway A48. Thus, when a condition for the formula (8) is satisfied, the voltage of the capacitor 402 is held to the voltage of the direct-current power supply 8.

Also when a diode 104 and the switch 102 have a short circuit failure, an overvoltage in a capacitor 401 can be prevented by turning off the protection switch 216b. Also in this case, the conditions for critical damping and overdamping are met. Therefore, the attained voltage of the capacitor 401 or 402 is held to the voltage of the direct-current power supply 8, in both cases where the diode 103 and the switch 101 have a short circuit failure and where the diode 104 and the switch 102 have a short circuit failure, when the resistance value R of the resistance 620 satisfies the following formula (9), letting C be the smaller of the capacity of the capacitor 401 and the capacity of the capacitor 402.

$$R \geq 2 \times (2 \times L/C)^{1/2} \quad (9)$$

Twentieth Embodiment

A three-level chopper apparatus according to a twentieth embodiment is now described.

Figure 49:
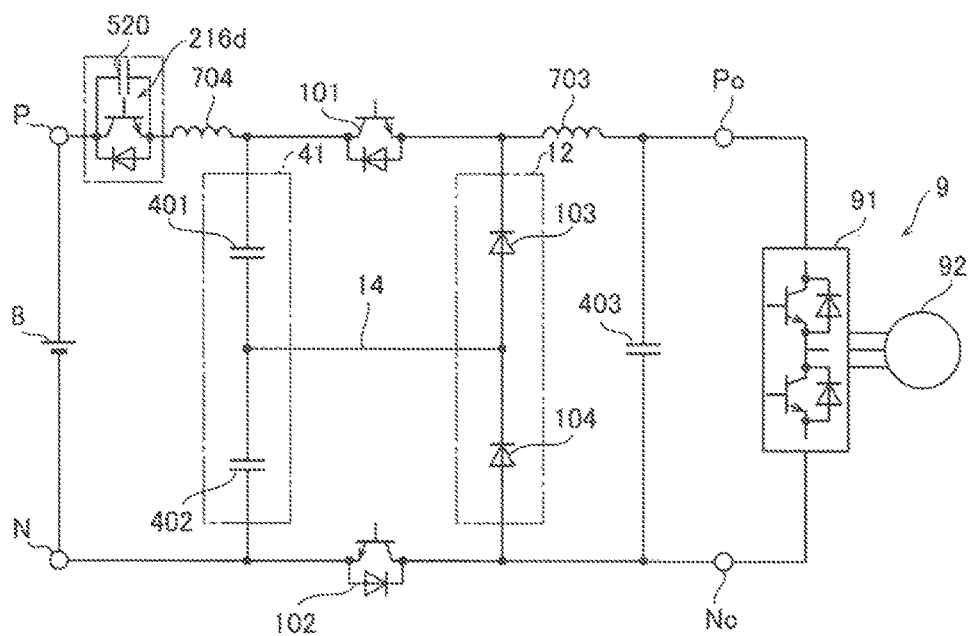
FIG. 49 is a circuit configuration diagram of a three-level chopper apparatus according to a twentieth embodiment of the present invention.

According to the twentieth embodiment, the three-level chopper apparatus is provided with a protection switch 216d connected in series to a reactor 704 and a protection capacitor 520 connected in parallel to both ends of the protection switch 216d, as shown in FIG. 49. The protection switch 216d and the protection capacitor 520 are examples of the "tenth protection switch" and the "fourth protection capacitor" in the claims, respectively.

During the normal operation, the protection switch 216d is in an on-state, and both ends of the protection capacitor 520 short-circuit. On/off of switches 101 and 102 is switched so that the same current pathways as those in FIGS. 6, 7, 8, and 9 according to the first embodiment can be obtained, and the output voltage can be converted into a direct-current voltage lower than the input voltage.

Figure 50:
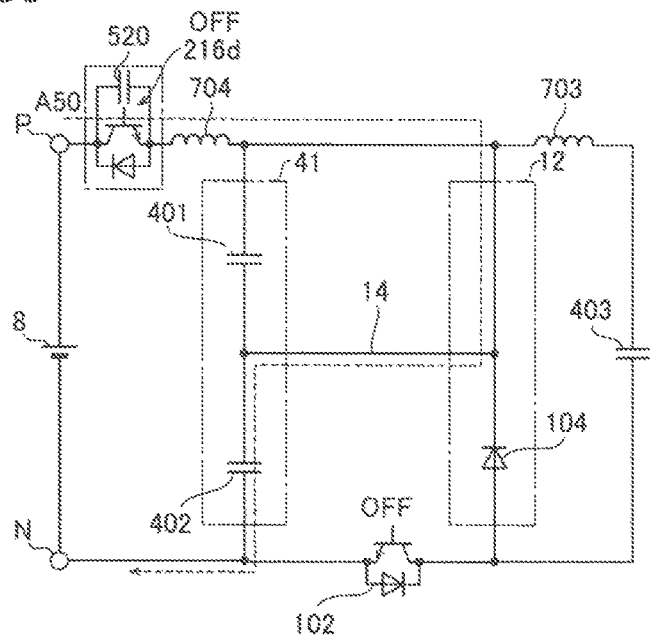
FIG. 50 illustrates an equivalent circuit in the case where a load is separated and an unbroken switch and a protection switch are turned off when one switch and one diode have a short circuit failure in the circuit in FIG. 49.

When a diode 103 and one switch 101 have a short circuit failure, as shown in FIG. 50, the protection switch 216d is turned off so that the protection capacitor 520 is inserted into a charging pathway A50 for a capacitor 402. Although the sum of the voltage of the capacitor 402 and the voltage of the protection capacitor 520 is higher than the voltage of a direct-current power supply 8, the summed voltage is shared, and hence an overvoltage in the capacitor 402 can be prevented.

Twenty-First Embodiment

A three-level chopper apparatus according to a twenty-first embodiment is now described.

Figure 51:
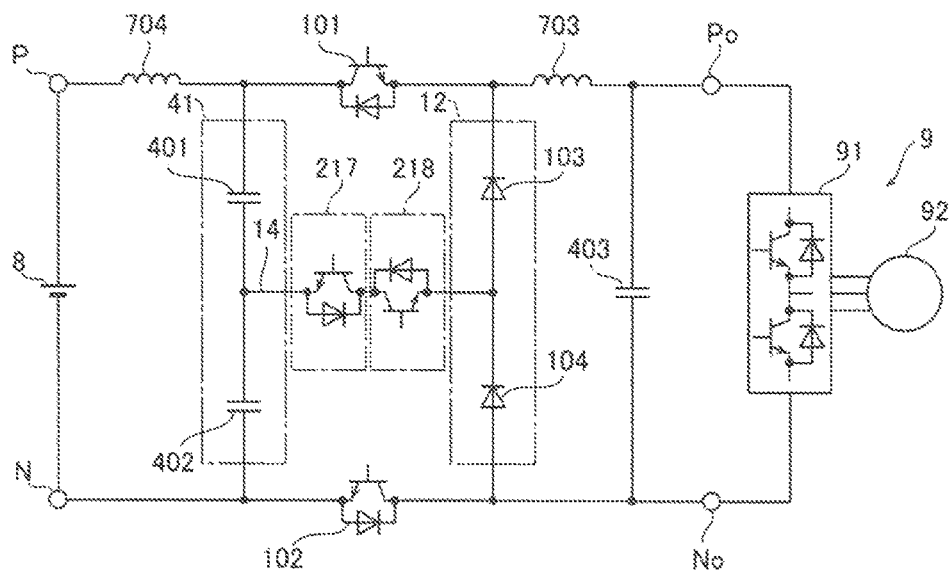
FIG. 51 is a circuit configuration diagram of a three-level chopper apparatus according to a twenty-first embodiment of the present invention.

According to the twenty-first embodiment, the three-level chopper apparatus is provided with a protection switch 217 connected in series to a connection path 14 and a protection switch 218, as shown in FIG. 51. The protection switch 217 and the protection switch 218 are examples of the "eleventh protection switch" and the "fourteenth protection switch" in the claims, respectively.

During the normal operation, the protection switches 217 and 218 are in an on-state, and on/off of switches 101 and 102 is switched so that the same current pathways as those in FIGS. 6, 7, 8, and 9 according to the first embodiment can be obtained, and the output voltage can be converted into a direct-current voltage lower than the input voltage.

Figure 52:
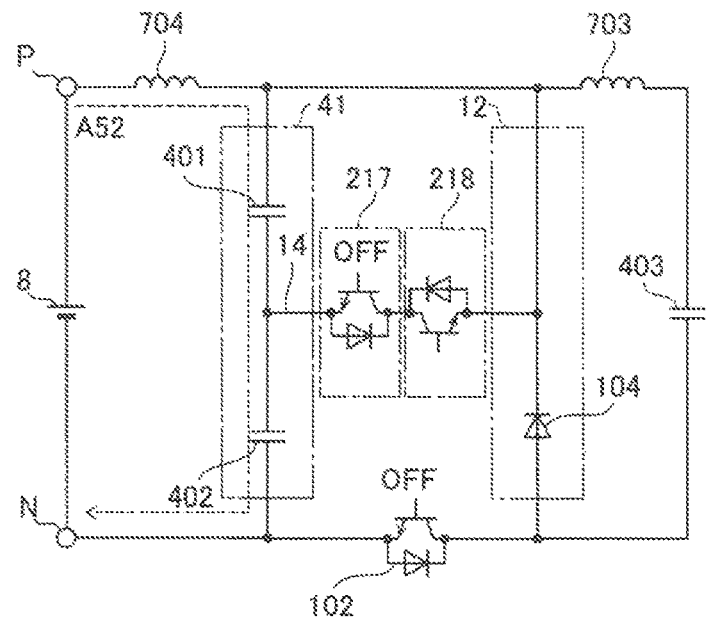
FIG. 52 illustrates an equivalent circuit in the case where a load is separated and an unbroken switch and a protection switch are turned off when one switch and one diode have a short circuit failure in the circuit in FIG. 51.

When one switch 101 and a diode 103 have a short circuit failure, a load 9 is separated, and the protection switch 217 is disconnected simultaneously with disconnection of the other switch 102 to obtain an equivalent circuit in FIG. 52. In this case, both capacitors 401 and 402 are charged by a resonant circuit including the two capacitors 401 and 402, shown by a pathway A52. Only the capacitor 402 is no longer charged, and hence an increase in the voltage of the capacitor 402 is significantly reduced by providing the protection switch 217.

The protection switches 217 and 218 through which a current can circulate, such as IGBTs, RC-IGBTs, or MOSFETs to which diodes are connected in anti-parallel, are required so that a current bi-directionally flows in the connection path 14 also during the normal operation. When a freewheeling diode is used, no reverse recovery occurs during the normal operation, and hence a low loss is achieved if a Si-pn diode is used. If a SiC-SB diode is used, the forward recovery voltage can be reduced, and the noise can be reduced. If the SiC-SB diode and the Si-pn diode are placed in parallel, the forward recovery voltage and the on-voltage can be reduced. That is to say a low noise and a low loss can be achieved. Furthermore, an effect of preventing the short circuit of the capacitor 401 can be obtained by immediately turning off the protection switch 217.

Twenty-Second Embodiment

A three-level chopper apparatus according to a twenty-second embodiment is now described.

Figure 53:
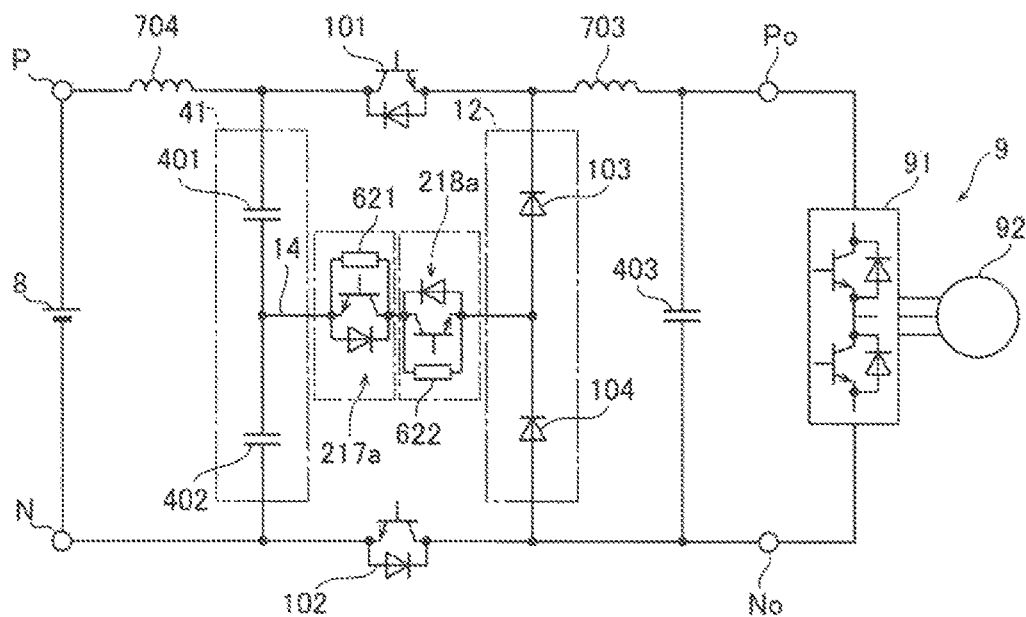
FIG. 53 is a circuit configuration diagram of a three-level chopper apparatus according to a twenty-second embodiment of the present invention.

According to the twenty-second embodiment, the three-level chopper apparatus is provided with a protection switch 217a connected in series to a connection path 14 and a resistance 621 connected in parallel to the protection switch 217a, as shown in FIG. 53. The three-level chopper apparatus is further provided with a protection switch 218a connected in series to the connection path 14 and a resistance 622 connected in parallel to the protection switch 218a. The protection switch 217a and the resistance 621 are examples of the "twelfth protection switch" and the "fifth resistance" in the claims, respectively. The protection switch 218a and the resistance 622 are examples of the "fifteenth protection switch" and the "sixth resistance" in the claims, respectively.

During the normal operation, the protection switches 217a and 218a are in an on-state, and both ends of the resistances 621 and 622 short-circuit. On/off of switches 101 and 102 is switched so that the same current pathways as those in FIGS. 6, 7, 8, and 9 according to the first embodiment can be obtained, and the output voltage can be converted into a direct-current voltage lower than the input voltage.

Figure 54:
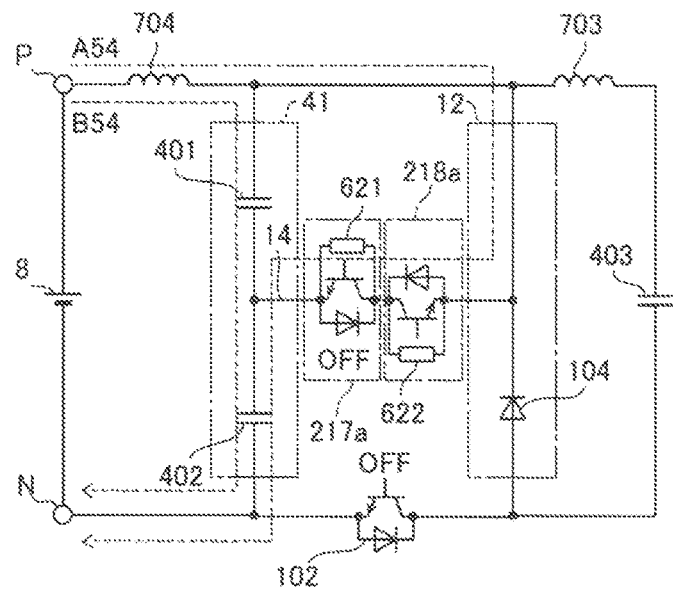
FIG. 54 illustrates an equivalent circuit in the case where a load is separated and an unbroken switch and a protection switch are turned off when one switch and one diode have a short circuit failure in the circuit in FIG. 53.

When one switch 101 and a diode 103 of the three-level chopper apparatus have a short circuit failure, a load 9 is separated, and the protection switch 217a is disconnected simultaneously with disconnection of the other switch 102 to obtain an equivalent circuit in FIG. 54. In this case, a damped oscillation circuit including the resistance 621 in which a current flows, shown by a pathway A54, and a resonant circuit including two capacitors 401 and 402, shown by a pathway B54, are formed.

The voltage of the capacitor 401 is equal to the voltage of the resistance 621 connected in parallel to the protection switch 217a. When the voltage of a capacitor 403 on an output side is higher than the sum of the voltages of the capacitors 401 and 402 on an input side, a current pathway in which a current flows from the capacitor 403 on the output side to the capacitor 402 through the resistance 621 or the capacitor 401 and circulates through the switch 102 to the capacitor 403 is formed. When there is no current flowing from the capacitor 403 on the output side or a direct-current power supply 8 to the capacitor 402, the capacitor 401 is discharged through the resistance 621. According to the above behavior, a current (charge) flowing into the capacitor 402 is reduced as compared with the case where no protection switch 217a or resistance 621 is provided, and hence an increase in the voltage of the capacitor 402 is significantly reduced by providing the protection switch 217a and the resistance 621.

The protection switches 217a and 218a through which a current can circulate, such as IGBTs, RC-IGBTs, or MOS-FETs to which diodes are connected in anti-parallel, are required so that a current bi-directionally flows in the connection path 14 also during the normal operation. When a freewheeling diode is used, no reverse recovery occurs during the normal operation, and hence a low loss is achieved if a Si-pn diode is used. If a SiC-SB diode is used, the forward recovery voltage can be reduced, and the noise can be reduced. If the SiC-SB diode and the Si-pn diode are placed in parallel, the forward recovery voltage and the on-voltage can be reduced. That is to say a low noise and a low loss can be achieved. Furthermore, an effect that the resistance 621 prevents the short circuit of the capacitor 401 can be obtained by immediately turning off the protection switch 217a.

Twenty-Third Embodiment

A three-level chopper apparatus according to a twenty-third embodiment is now described.

Figure 55:
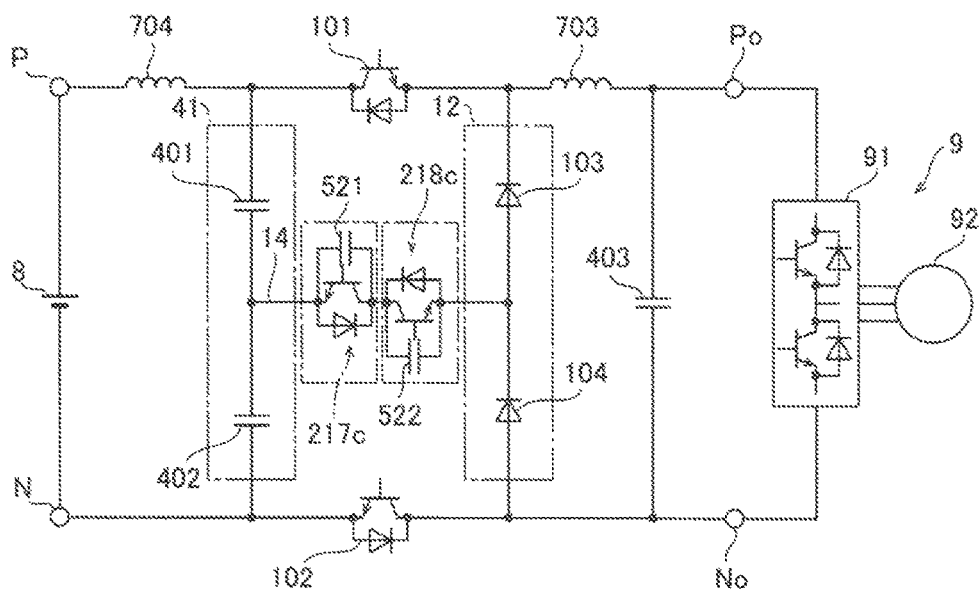
FIG. 55 is a circuit configuration diagram of a three-level chopper apparatus according to a twenty-third embodiment of the present invention.

According to the twenty-third embodiment, the three-level chopper apparatus is provided with a protection switch 217c connected in series to a connection path 14 and a protection capacitor 521 connected in parallel to the protection switch 217c, as shown in FIG. 55. The three-level chopper apparatus is further provided with a protection switch 218c connected in series to the connection path 14 and a protection capacitor 522 connected in parallel to the protection switch 218c. The protection switch 217c and the protection capacitor 521 are examples of the "thirteenth protection switch" and the "fifth protection capacitor" in the claims, respectively. The protection switch 218c and the protection capacitor 522 are examples of the "sixteenth protection switch" and the "sixth protection capacitor" in the claims, respectively.

During the normal operation, the protection switches 217c and 218c are in an on-state, and both ends of the protection capacitors 521 and 522 short-circuit. On/off of switches 101 and 102 is switched so that the same current pathways as those in FIGS. 6, 7, 8, and 9 according to the first embodiment can be obtained, and the output voltage can be converted into a direct-current voltage lower than the input voltage.

Figure 56:
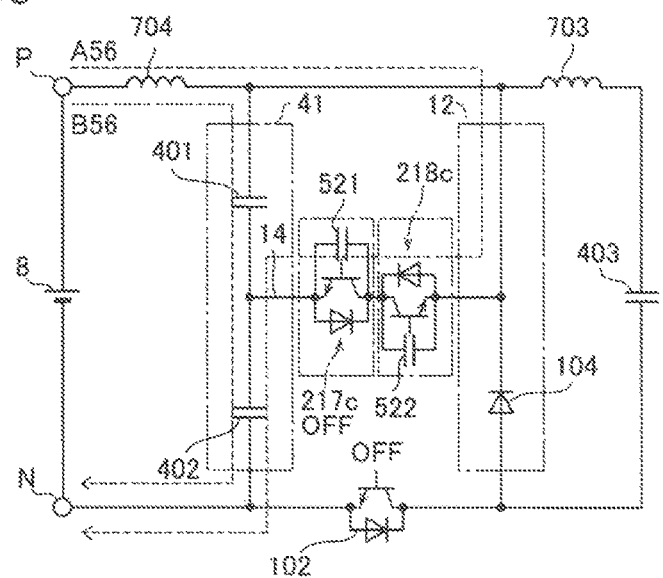
FIG. 56 illustrates an equivalent circuit in the case where a load is separated and an unbroken switch and a protection switch are turned off when one switch and one diode have a short circuit failure in the circuit in FIG. 55.

When a diode 103 and one switch 101 have a short circuit failure, as shown in FIG. 56, a load 9 is separated, and the protection switch 217c is turned off simultaneously with disconnection of the other switch 102. Thus, the protection capacitor 521 is inserted into a charging pathway A56 for a capacitor 402. The voltage of the protection capacitor 521 and the voltage of a capacitor 401 must be equal to each other, and hence a current also flows through a charging pathway B56. Although the sum of the voltage of the capacitor 402 and the voltage of the protection capacitor 521 is higher than the voltage of a direct-current power supply 8, the summed voltage is shared by the capacitor 402 and the protection capacitor 521, and hence an overvoltage in the capacitor 402 is prevented.

The protection switches 217c and 218c through which a current can circulate, such as IGBTs, RC-IGBTs, or MOS-FETs to which diodes are connected in anti-parallel, are required so that a current bi-directionally flows in the connection path 14 also during the normal operation. When a freewheeling diode is used, no reverse recovery occurs during the normal operation, and hence a low loss is achieved if a Si-pn diode is used. If a SiC-SB diode is used, the forward recovery voltage can be reduced, and the noise can be reduced. If the SiC-SB diode and the Si-pn diode are placed in parallel, the forward recovery voltage and the on-voltage can be reduced. That is to say a low noise and a low loss can be achieved.

[Modification]

The embodiments disclosed this time must be considered as illustrative in all points and not restrictive. The range of the present invention is shown not by the above description of the embodiments but by the scope of claims for patent, and all modifications within the meaning and range equivalent to the scope of claims for patent are further included.

For example, while the protection switch circuit according to the present invention is provided in the connection path, or is provided in series to the reactor or switch in each of the aforementioned first to twenty-third embodiments, the present invention is not restricted to this. According to the present invention, the protection switch circuit may alternatively be provided in a pathway other than the connection path and the pathway in series with the reactor or the switch so far as on/off of the protection switch circuit can be controlled to shut off a pathway through which an overvoltage is applied to the capacitor when there is a failure.

Figure 57:
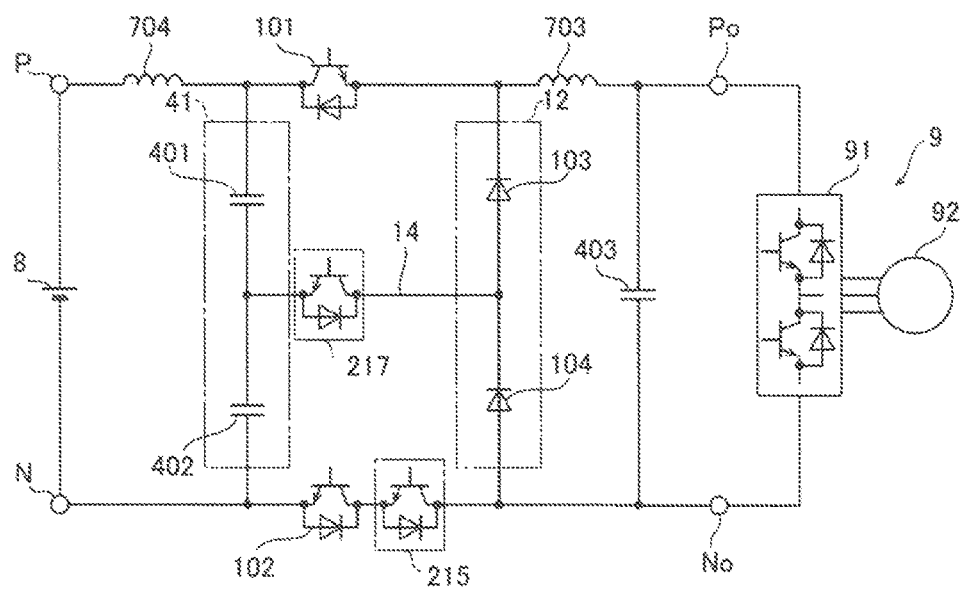
FIG. 57 is a circuit configuration diagram of a three-level chopper apparatus according to a modification.

Furthermore, a three-level chopper apparatus may alternatively be configured by properly combining the first to twenty-third embodiments. For example, a three-level chopper apparatus shown in FIG. 57, obtained by combining the sixteenth embodiment and the twenty-first embodiment is conceivable. In the three-level chopper apparatus in FIG. 57, a protection switch 215 is connected in series to a switch 102. Furthermore, a protection switch 217 is connected in series to a connection path 14. The protection switches 215 and 217 are examples of the "fourteenth protection switch" and the "eleventh protection switch" in the claims, respectively.

When a diode 103 and one switch 101 have a short circuit failure, a load 9 is separated, and the protection switch 217 is turned off simultaneously with disconnection of the other switch 102. Thus, similarly to the twenty-first embodiment, a charging pathway passes through a capacitor 401 and a capacitor 402, and an overvoltage in the capacitor 402 can be prevented.

When a diode 104 and one switch 102 have a short circuit failure, the load 9 is separated, and the protection switch 215 is turned off simultaneously with disconnection of the other switch 101. Thus, similarly to the sixteenth embodiment, the charging pathway passes through the capacitor 401 and the capacitor 402, and an overvoltage in the capacitor 401 can be prevented.

What is claimed is:

1. A three-level chopper apparatus comprising:
   a direct-current power supply;
   a first switch and a second switch;
   a first diode and a second diode;
   a first capacitor, a second capacitor, and a third capacitor;
   a first reactor and a second reactor;
   a connection path; and
   a protection switch circuit, wherein
   the first switch, the first diode, the second diode, the second switch, the second capacitor, and the first capacitor are connected in series to each other in this order in a loop,
   the direct-current power supply is connected in parallel between a connection point between the first capacitor and the first switch and a connection point between the second switch and the second capacitor through the first reactor,
   the third capacitor is connected in parallel between a connection point between the first diode and the first switch and a connection point between the second switch and the second diode through the second reactor,
   the connection path connects a connection point between the first diode and the second diode and a connection point between the first capacitor and the second capacitor, and
   the protection switch circuit is controllable to change a current pathway through which an overvoltage is applied to the second capacitor or the first capacitor to a current pathway through which no overvoltage is applied to the second capacitor or the first capacitor when at least one of the first switch and the first diode or at least one of the second switch and the second diode has a failure.

2. The three-level chopper apparatus according to claim 1, wherein
   the protection switch circuit is a bidirectional protection switch connected in series to the connection path.

3. The three-level chopper apparatus according to claim 2, wherein
   the bidirectional protection switch includes:
   a switch circuit in which a semiconductor switch element including at least one of an IGBT, a MOSFET, and a bipolar transistor is connected in series to a diode, or
   two reverse blocking IGBTs connected in anti-parallel to each other.

4. The three-level chopper apparatus according to claim 3, wherein
   the diode of the bidirectional protection switch includes a silicon diode.

5. The three-level chopper apparatus according to claim 3, wherein
   the diode of the bidirectional protection switch includes a silicon carbide diode.

6. The three-level chopper apparatus according to claim 3, wherein
   the diode of the bidirectional protection switch includes a diode in which a silicon diode and a silicon carbide diode are connected in parallel to each other.

7. The three-level chopper apparatus according to claim 2, wherein
   the bidirectional protection switch includes:
   a switch circuit in which a semiconductor switch element including at least one of an IGBT, a MOSFET, and a bipolar transistor is connected in anti-parallel to a diode, or
   two MOSFETs or two reverse conducting IGBTs connected in anti-series to each other.

8. The three-level chopper apparatus according to claim 2, wherein
   the protection switch circuit includes a first resistance connected in parallel to the bidirectional protection switch.

9. The three-level chopper apparatus according to claim 2, wherein
   the protection switch circuit includes a first protection capacitor connected in parallel to the bidirectional protection switch.

10. The three-level chopper apparatus according to claim 1, wherein
    the protection switch circuit includes:
    a first protection switch connected in series between the first diode and the connection path,
    a second protection switch connected in series between the second diode and the connection path, and
    a second resistance connected in parallel between a connection point between the first diode and the first protection switch and a connection point between the second protection switch and the second diode.

11. The three-level chopper apparatus according to claim 1, wherein
    the protection switch circuit includes:
    a third protection switch connected in series between the first diode and the connection path,
    a fourth protection switch connected in series between the second diode and the connection path, and
    a second protection capacitor connected in parallel between a connection point between the first diode and the third protection switch and a connection point between the fourth protection switch and the second diode.

12. The three-level chopper apparatus according to claim 1, wherein
the protection switch circuit includes:
a fifth protection switch connected in series between the first capacitor and the connection path,
a sixth protection switch connected in series between the second capacitor and the connection path, and
a third resistance connected in parallel between a connection point between the first capacitor and the fifth protection switch and a connection point between the sixth protection switch and the second capacitor.

13. The three-level chopper apparatus according to claim 12, wherein
a resistance value R satisfies a following formula (1): $R \geq 2 \times (2 \times L/C)^{1/2}$ where R represents a resistance value of the third resistance or a fourth resistance, L represents an inductance of the first reactor, and C represents the smaller of a capacity of the first capacitor and a capacity of the second capacitor.

14. The three-level chopper apparatus according to claim 1, wherein
the protection switch circuit includes:
a seventh protection switch connected in series between the first capacitor and the connection path,
an eighth protection switch connected in series between the second capacitor and the connection path, and
a third protection capacitor connected in parallel between a connection point between the first capacitor and the seventh protection switch and a connection point between the eighth protection switch and the second capacitor.

15. The three-level chopper apparatus according to claim 1, wherein
the protection switch circuit includes:
a ninth protection switch connected in series to the first reactor, and
a fourth resistance connected in parallel to both ends of the ninth protection switch.

16. The three-level chopper apparatus according to claim 1, wherein
the protection switch circuit includes:
a tenth protection switch connected in series to the first reactor, and
a fourth protection capacitor connected in parallel to both ends of the tenth protection switch.

17. The three-level chopper apparatus according to claim 1, wherein
the protection switch circuit includes both or one of:
a first protection switch partial circuit connected in series to at least one of the first switch, the second capacitor, the first diode, and the connection path, and
a second protection switch partial circuit connected in series to at least one of the second switch, the first capacitor, the second diode, and the connection path.

18. The three-level chopper apparatus according to claim 17, wherein
the first protection switch partial circuit includes an eleventh protection switch, and is connected in series to at least one of the first switch, the first diode, and the connection path.

19. The three-level chopper apparatus according to claim 17, wherein
the first protection switch partial circuit includes:
a twelfth protection switch, and
a fifth resistance connected in parallel to the twelfth protection switch.

20. The three-level chopper apparatus according to claim 19, wherein
the first protection switch partial circuit is connected in series to the second capacitor, and
a resistance value Ra satisfies a following formula (2): $Ra \geq 2 \times (2 \times L/C2)^{1/2}$ where Ra represents a resistance value of the fifth resistance, L represents an inductance of the first reactor, and C2 represents a capacity of the second capacitor.

21. The three-level chopper apparatus according to claim 17, wherein
the first protection switch partial circuit includes:
a thirteenth protection switch, and
a fifth protection capacitor connected in parallel to the thirteenth protection switch.

22. The three-level chopper apparatus according to claim 17, wherein
the second protection switch partial circuit includes a fourteenth protection switch, and is connected in series to the second switch, the second diode, or the connection path.

23. The three-level chopper apparatus according to claim 17, wherein
the second protection switch partial circuit includes:
a fifteenth protection switch, and
a sixth resistance connected in parallel to the fifteenth protection switch.

24. The three-level chopper apparatus according to claim 23, wherein
the second protection switch partial circuit is connected in series to the first capacitor, and
a resistance value Rb satisfies a following formula (3): $Rb \geq 2 \times (2 \times L/C1)^{1/2}$ where Rb represents a resistance value of the sixth resistance, L represents an inductance of the first reactor, and C1 represents a capacity of the first capacitor.

25. The three-level chopper apparatus according to claim 17, wherein
the second protection switch partial circuit includes:
a sixteenth protection switch, and
a sixth protection capacitor connected in parallel to the sixteenth protection switch.

* * * * *